US010370028B2

(12) United States Patent
Matsumura et al.

(10) Patent No.: US 10,370,028 B2
(45) Date of Patent: Aug. 6, 2019

(54) POWER STEERING DEVICE

(71) Applicant: HITACHI AUTOMOTIVE SYSTEMS, LTD., Hitachinaka-shi, Ibaraki (JP)

(72) Inventors: Tatsuo Matsumura, Saitama (JP); Masaki Watanabe, Saitama (JP)

(73) Assignee: KNORR-BREMSE STEERING SYSTEM JAPAN LTD., Saitama (JP)

( * ) Notice: Subject to any disclaimer, the term of this patent is extended or adjusted under 35 U.S.C. 154(b) by 162 days.

(21) Appl. No.: 15/549,721

(22) PCT Filed: Jan. 29, 2016

(86) PCT No.: PCT/JP2016/052587
§ 371 (c)(1),
(2) Date: Aug. 9, 2017

(87) PCT Pub. No.: WO2016/132854
PCT Pub. Date: Aug. 25, 2016

(65) Prior Publication Data
US 2018/0022381 A1  Jan. 25, 2018

(30) Foreign Application Priority Data

Feb. 17, 2015 (JP) ................................. 2015-028634

(51) Int. Cl.
*B62D 5/04* (2006.01)
*B62D 6/00* (2006.01)
(Continued)

(52) U.S. Cl.
CPC ................ *B62D 5/14* (2013.01); *B62D 5/00* (2013.01); *B62D 5/046* (2013.01); *B62D 5/0409* (2013.01);
(Continued)

(58) Field of Classification Search
CPC .... B62D 5/065; B62D 5/0463; B62D 5/0472; B62D 5/0409; B62D 5/06; B62D 5/046;
(Continued)

(56) References Cited

U.S. PATENT DOCUMENTS 6,052,633 A * 4/2000 Fukuyama ............. B62D 5/065
180/400
7,337,872 B2 * 3/2008 Bohm .................. B62D 5/0409
180/422
(Continued)

FOREIGN PATENT DOCUMENTS

JP    H10-258756 A    9/1998
JP    2005-096767 A   4/2005
(Continued)

Primary Examiner — Joseph M Rocca
Assistant Examiner — Daniel S Yeagley
(74) Attorney, Agent, or Firm — Foley & Lardner LLP

(57) ABSTRACT

Provided is a power steering device capable of causing control that uses a pump device and control that uses an electric motor on an input shaft to cooperate with each other. The power steering device includes a power cylinder including a pair of hydraulic chambers partitioned by a piston and configured to generate a steering assist force for a steered wheel, a pump device configured to be driven through control by a first electric motor and configured to discharge working fluid, a rotary valve configured to selectively supply the working fluid supplied from the pump device to the pair of hydraulic chambers in accordance with relative rotation between the input shaft and the output shaft, a second electric motor provided so as to surround at least a part in an axial direction of the input shaft and configured to control the rotation of the input shaft, and a second electric motor control part installed in a control device and configured to output a control signal for controlling driving of the second electric motor based on a revolution number signal of the first electric motor.

25 Claims, 8 Drawing Sheets

(51) Int. Cl.
  *B62D 5/14*    (2006.01)
  *B62D 5/06*    (2006.01)
  *B62D 5/083*   (2006.01)
  *B62D 5/12*    (2006.01)
  *B62D 5/22*    (2006.01)
  *B62D 5/00*    (2006.01)
  *B62D 5/065*   (2006.01)

(52) U.S. Cl.
  CPC ......... *B62D 5/0463* (2013.01); *B62D 5/0472* (2013.01); *B62D 5/06* (2013.01); *B62D 5/064* (2013.01); *B62D 5/065* (2013.01); *B62D 5/083* (2013.01); *B62D 5/12* (2013.01); *B62D 5/22* (2013.01); *B62D 6/00* (2013.01); *B62D 6/008* (2013.01)

(58) Field of Classification Search
  CPC ........ B62D 5/14; B62D 15/029; B62D 6/008; B62D 6/00
  See application file for complete search history.

(56) References Cited

U.S. PATENT DOCUMENTS

| | | | |
|---|---|---|---|
| 2006/0027418 A1* | 2/2006 | Miyajima | B62D 5/006 180/446 |
| 2007/0205037 A1* | 9/2007 | Miyajima | B62D 5/0463 180/422 |
| 2010/0147618 A1* | 6/2010 | Osonoi | B62D 5/001 180/403 |
| 2015/0298728 A1 | 10/2015 | Yoda et al. | |

FOREIGN PATENT DOCUMENTS

| | | |
|---|---|---|
| JP | 2006-213094 A | 8/2006 |
| JP | 2008-184049 A | 8/2008 |
| JP | 2010-143242 A | 7/2010 |
| JP | 2013-184585 A | 9/2013 |
| WO | WO-2014/103556 A1 | 7/2014 |

* cited by examiner

POWER STEERING DEVICE

TECHNICAL FIELD

The present invention relates to a power steering device.

BACKGROUND ART

Hitherto, there has been known a power steering device capable of supplying working fluid discharged by a pump device to a power cylinder to generate a steering assist force, and including an electric motor on an input shaft, which is rotated by a steering operation on a steering wheel (for example, refer to Patent Literature 1).

CITATION LIST

Patent Literature

PTL 1: JP 2005-96767 A

SUMMARY OF INVENTION

Technical Problem

However, cooperative control between control of using the pump device and control of using the electric motor on the input shaft is not considered in the related-art power steering device. It is therefore an object of the present invention to provide a power steering device capable of causing both control to cooperate with each other.

Solution to Problem

In order to attain the above-mentioned object, a power steering device according to one embodiment of the present invention is configured to control driving of an electric motor on an input shaft based on output of an electric motor for controlling driving of a pump device.

As a result, the control that uses the pump device and the control that uses the electric motor on the input shaft can be caused to cooperate with each other.

DESCRIPTION OF EMBODIMENTS

A description is now given of modes for carrying out a power steering device according to the present invention by using embodiments with reference to the drawings.

First Embodiment

Figure 1:
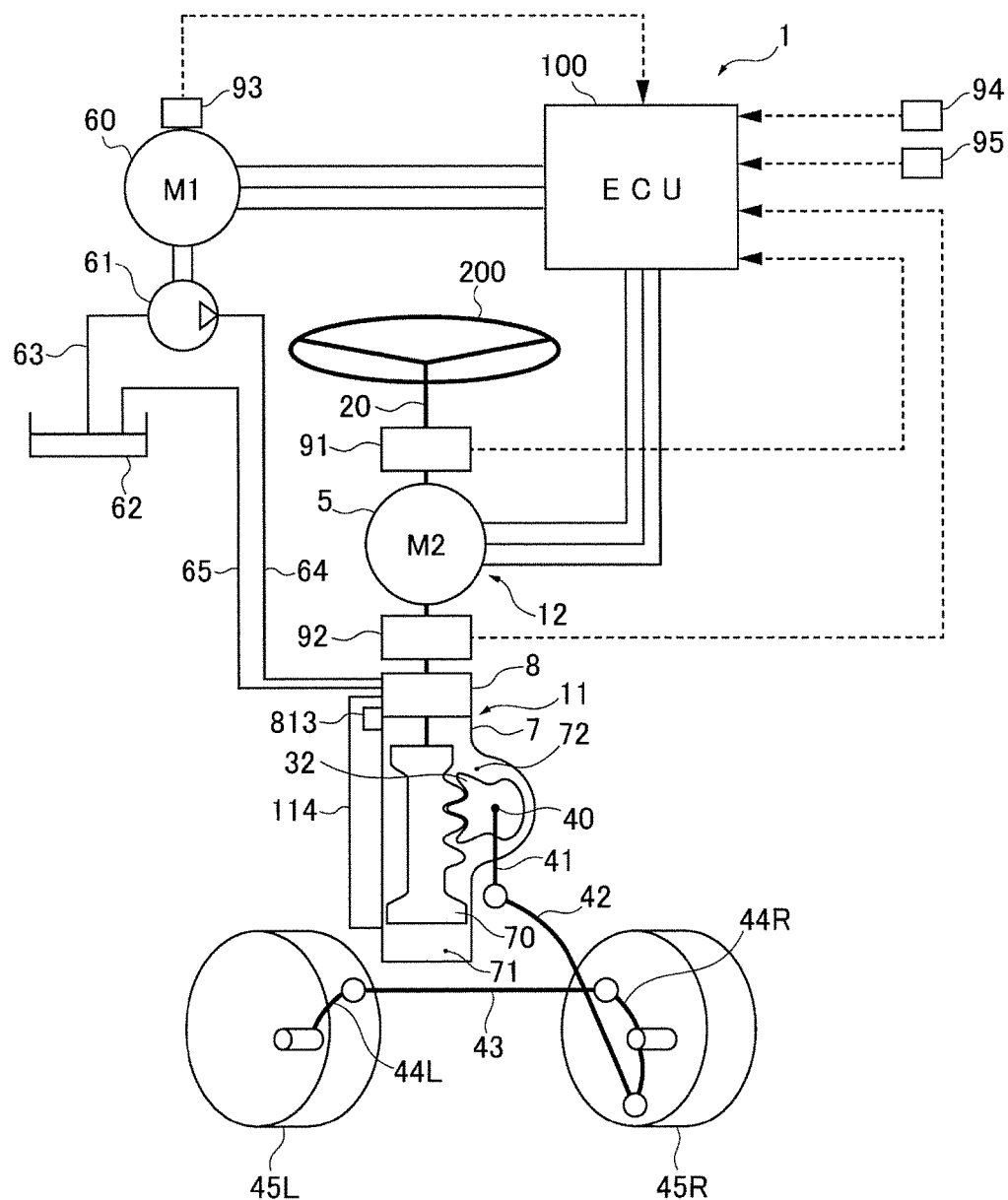
FIG. 1 is a diagram for illustrating a configuration of a steering system to which a power steering device according to a first embodiment is applied.
Figure 2:
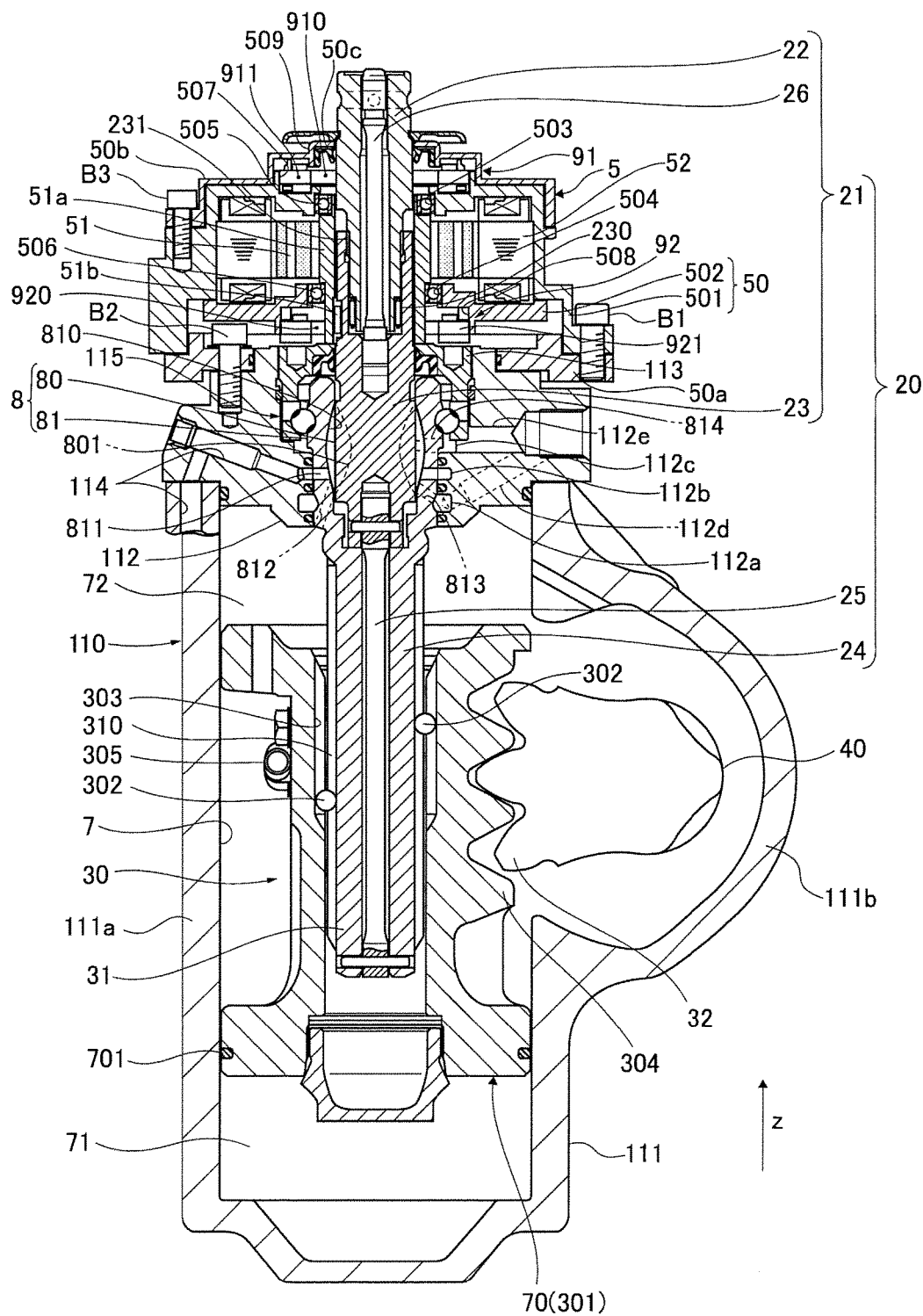
FIG. 2 is a partial cross sectional view for illustrating the power steering device according to the first embodiment.

First, a description is given of a configuration. A power steering device 1 (hereinafter simply referred to as "device 1") according to a first embodiment is applied to a steering system of a vehicle. First, referring to FIG. 1 and FIG. 2, a description is given of a mechanical configuration. FIG. 1 is a diagram for schematically illustrating a configuration of the steering system to which the device 1 is applied. FIG. 2 is a cross sectional view of a part of the device 1 on a plane passing through an axial center of a steering shaft 20. In the following, a z axis is provided in a direction in which the axial center of the steering shaft 20 extends, and a side on which a steering wheel 200 is connected to the steering shaft 20 is set positive. The steering system includes, as a steering mechanism, an operation mechanism, a gear mechanism, and a link mechanism. The operation mechanism includes the steering wheel 200 and the steering shaft 20. The steering shaft 20 is divided into an input shaft 21 (in a broad sense) and an output shaft 24. The steering wheel 200 is coupled to a positive side in the z axis direction of the input shaft 21. A rotation force (steering torque) caused by a steering operation on the steering wheel 200 performed by a driver is input to the input shaft 21. The input shaft 21 is rotated by the steering operation. Moreover, the input shaft 21 transmits a steering reaction force to the driver. The input shaft 21 is divided into an input shaft 22 (in a narrow sense) and an intermediate shaft 23. The input shaft 22 has a tubular shape.

The intermediate shaft 23 is a stub shaft arranged on a negative side in the z axis direction of the input shaft 22. The intermediate shaft 23 has a bottomed tubular shape on the positive side in the z axis direction. The negative side in the z axis direction of the input shaft 22 is inserted into an inner periphery of the positive side in the z axis direction of the intermediate shaft 23, and is rotatably supported on the inner periphery of the intermediate shaft 23 via a needle bearing 230. Recesses and protrusions 231 are formed side by side in the circumferential direction on the positive side in the z axis direction on the inner periphery of the intermediate shaft 23. Recesses and protrusions are also formed side by side in the circumferential direction on an outer periphery of the input shaft 22 opposing the inner periphery of the intermediate shaft 23. A second torsion bar 26 is provided between the input shaft 22 and the intermediate shaft 23. The second torsion bar 26 is inserted into an inner periphery side of the input shaft 22. A positive side in the z axis direction of the second torsion bar 26 is fixed to a positive side in the z axis of the input shaft 22 by a pin. A negative side in the z axis direction of the second torsion bar 26 protrudes toward the negative side in the z axis direction from the input shaft 22, and is fixed to the intermediate shaft 23. The intermediate shaft 23 is coupled to the input shaft 22 so as to be relatively rotatable via an elastic deformation (torsion) of the second torsion bar 26. The rotation force is input from the input shaft 22 to the intermediate shaft 23 via the second torsion bar 26. The intermediate shaft 23 rotates as the input shaft 22 rotates. Moreover, the intermediate shaft 23 transmits a rotation reaction force to the input shaft 22 via the second torsion bar 26. When the intermediate shaft 23 rotates by an amount equal to or more than a predetermined amount from a neutral position with respect to the input shaft 22, the recesses and protrusions 231 of the intermediate shaft 23 abut against and mesh with the recesses and protrusions of the input shaft 22. As a result, the relative rotation amount between both the shafts 22 and 23 is restricted to an amount equal to or less than a predetermined amount.

The output shaft 24 is arranged on a negative side in the z axis direction of the input shaft 21 (intermediate shaft 23). In other words, the intermediate shaft 23 is arranged between the input shaft 22 and the output shaft 24. The output shaft 24 has a tubular shape. A negative side in the z axis direction of the intermediate shaft 23 is inserted into an inner periphery side of a tubular portion formed in a positive side in the z axis direction of the output shaft 24. A first torsion bar 25 is provided between the intermediate shaft 23 and the output shaft 24. The first torsion bar 25 is inserted into an inner periphery side of the output shaft 24. A positive side in the z axis direction of the first torsion bar 25 is fixed to a negative side in the z axis of the intermediate shaft 23 by a pin. A negative side in the z axis direction of the first torsion bar 25 is fixed to a negative side in the z axis of the output shaft 24 by a pin. The output shaft 24 is coupled to the intermediate shaft 23 so as to relatively rotate via an elastic deformation (torsion) of the first torsion bar 25. The rotation force is input from the intermediate shaft 23 to the output shaft 24 via the first torsion bar 25. The output shaft 24 rotates as the intermediate shaft 23 rotates. Moreover, the output shaft 24 transmits the rotation reaction force to the intermediate shaft 23 via the first torsion bar 25.

The gear mechanism is of the ball nut type, and includes a ball nut mechanism 30, a worm shaft (thread shaft) 31, and a sector gear 32. The worm shaft 31 is provided integrally with a negative side in the z axis direction of the output shaft 24, and a thread groove 310 is formed on an outer periphery of the worm shaft 31. The ball nut mechanism 30 includes a nut 301 and a plurality of balls 302. The nut 301 has a tubular shape, and a thread groove 303 is formed on an inner periphery of the nut 301. A rack 304 is provided on one side surface of an outer periphery of the nut 301. A ball tube 305 is provided on another side surface of the outer periphery of the nut 301. The worm shaft 31 is inserted into an inner periphery side of the nut 301. The nut 301 fits to the worm shaft 31 so as to be relatively movable in the axial direction. The plurality of balls 302 are contained between the thread grove 303 of the nut 301 and the thread groove 310 of the worm shaft 31. The sector gear 32 meshes with the rack 304 of the nut 301. When the worm shaft 31 rotates, the balls 302 rotate to move in the grooves 310 and 303, and move the nut 301 in the z axis direction. The balls 302 circulate inside the grooves 310 and 303 via the ball tube 305. When the nut 301 moves in the z axis direction, the sector gear 32 rotates.

The link mechanism includes a sector shaft 40, a pitman arm 41, a drag link 42, and a tie rod 43. The sector shaft 40 is fixed to the sector gear 32. The sector shaft 40 extends generally coaxially with the sector gear 32, and rotates integrally with the sector gear 32. The pitman arm 41 is coupled to the sector shaft 40 and the drag link 42. The drag link 42 is coupled to the pitman arm 41 and a knuckle arm 44R of one steered wheel 45R. The tie rod 43 is coupled to knuckle arms 44L and 44R of both steered wheels 45L and 45R in a case of, for example, a rigid axle suspension. The pitman arm 41 transmits the rotation of the sector shaft 40 to the knuckle arm 44R via the drag link 42. The movement transmitted to the knuckle arm 44R is transmitted to the knuckle arm 44L of another steered wheel 45L via the tie rod 43.

The device 1 includes a first power steering mechanism 11, a second power steering mechanism 12, sensors 91 to 94, and a control device 100. The first power steering mechanism 11 includes a pump device 61, a power piston (hereinafter simply referred to as "piston") 70, a power cylinder 7, and a control valve 8. The piston 70 and the control valve 8 are contained in a housing 110. In other words, the first power steering mechanism 11 is of the integral type in which the power cylinder 7 and the control valve 8 are integrally assembled into the gear mechanism. The first power steering mechanism 11 is of the hydraulic type in which a hydraulic pressure generated by the pump device 61 is used. As the working fluid, for example, power steering fluid (PSF) is used.

The pump device 61 is a hydraulic source for discharging the working fluid, and is arranged outside the housing 110. The pump device 61 is of the variable displacement type in which a discharge amount (pump displacement) per rotation is variable. As the pump device 61, for example, a variable displacement vane pump including a flowrate control valve can be used. The flowrate control valve is configured to control the pump displacement, thereby restricting a discharge flowrate of the pump device 61 to a unique discharge flowrate or less. The pump device 61 may be of an electronic control type capable of changing the unique discharge flowrate with an electromagnetic valve. Moreover, the pump device 61 may be of the fixed displacement type constant in the pump displacement. Moreover, a pump of a type other than the vane pump, for example, a gear pump, may be used as the pump device 61. A suction side of the pump device 61 is connected to a reservoir tank 62 outside the housing 110 via a pipe (suction fluid passage) 63. A discharge side of the pump device 61 is connected to the control valve 8 via a pipe (supply fluid passage) 64. Driving of the pump device 61 is controlled by the first electric motor 60. In other words, the first power steering mechanism 11 is of the electric hydraulic type that uses power of the first electric motor 60 as a driving force for the pump device 61. The first electric motor 60 is a three-phase AC brushless motor.

The housing 110 includes a gear housing 111 and a valve housing 112. The gear housing 111 includes a cylinder part 111a and a sector gear containing part 111b. The cylinder part 111a has a bottomed tubular shape extending in the z axis direction, a negative side in the z axis direction thereof is closed, and a positive side in the z axis direction thereof is open. The sector gear containing part 111b is provided integrally with the cylinder part 111a in a shape swelling toward a radially outer side of the cylinder part 111a. The cylinder part 111a contains the piston 70 (ball nut mechanism 30). The sector gear containing part 111b contains the sector gear 32. The valve housing 112 has a tubular shape, and is arranged on the positive side in the z axis direction of the gear housing 111. The valve housing 112 seals an opening of the positive side in the z axis direction of the gear housing 111 (cylinder part 111a) in a liquid tight manner. A space surrounded by an inner peripheral surface of the gear housing 111 and a surface of the negative side in the z axis direction of the valve housing 112 forms the power cylinder 7. A cover 113 seals an opening of the positive side in the z axis direction of the valve housing 112 in the liquid tight manner. The valve housing 112 contains the control valve 8.

The piston 70 is integrated with the nut 301. The piston 70 is contained inside the power cylinder 7 so as to be movable in the z axis direction. The inside of the power cylinder 7 is partitioned into a first hydraulic chamber 71 and a second hydraulic chamber 72 (a pair of hydraulic chambers) by the piston 70. A piston seal 701 is installed on an outer periphery of the negative side in the z axis direction of the piston 70. The inside of the power cylinder 7 is formed into partitions of (partitioned into) the first hydraulic chamber 71 and the second hydraulic chamber 72 in a liquid tight manner by the piston seal 701. The inner periphery side of the cylinder part 111a on the negative side in the z axis direction with respect to the piston seal 701 constructs the first hydraulic chamber 71, and the inner periphery side of the cylinder part 111a on the positive side in the z axis direction with respect to the piston seal 701 and the inner periphery side of the sector gear containing part 111b construct the second hydraulic chamber 72. In other words, the sector gear 32 is arranged inside the second hydraulic chamber 72. The worm shaft 31 (thread groove 310), the balls 302, and the nut 301 (thread groove 303), which construct the ball nut mechanism 30, are arranged between the output shaft 24 and the piston 70. Those components function as a conversion mechanism for converting the rotation motion of the output shaft 24 into the axial movement of the piston 70. The rack 304 provided on the outer periphery of the nut 301 and the sector gear 32 meshing therewith function as a second conversion mechanism for converting the movement in the axial direction of the piston 70 into a rotation motion. The link mechanism functions as a transmission mechanism for transmitting the axial movement (the rotation motion of the sector gear 32) of the piston 70 to the steered wheels 45.

The control valve 8 is of the rotary valve type, and is constructed by a rotary valve. The control valve (hereinafter referred to as "rotary valve") 8 is configured to selectively supply the working fluid supplied from the pump device 61 to the first hydraulic chamber 71 and the second hydraulic chamber 72 of the power cylinder 7 in accordance with the relative rotation between the input shaft 21 (intermediate shaft 23) and the output shaft 24. The rotary valve 8 includes a rotor 80 and a sleeve 81. The rotor 80 is provided integrally with the negative side in the z axis direction of the intermediate shaft 23. The sleeve 81 is provided integrally with the tubular part in the positive side in the z axis direction of the output shaft 24. A supply port 112a, a first port 112b, and a discharge port 112c, which are lateral grooves extending in a circumferential direction (direction about the z axis) are formed side by side in the z axis direction on an inner periphery of the negative side in the z axis direction of the valve housing 112. A supply fluid passage 112d connected to the supply port 112a and a discharge fluid passage 112e connected to the discharge port 112c are formed inside the valve housing 112. A first fluid passage 114 connected to the first hydraulic chamber 71 is formed inside the valve housing 112 and the gear housing 111. The supply port 112a is connected to (discharge side of) the pump device 61 via the supply fluid passage 112d and the pipe (supply fluid passage) 64. The first port 112b is connected to the first hydraulic chamber 71 via the first fluid passage 114. The discharge port 112c is connected to the reservoir tank 62 via the discharge fluid passage 112e and the pipe (discharge fluid passage) 65.

A supply recessed part 801 and a discharge recessed part 802 (refer to FIG. 13), which are longitudinal grooves extending in the z axis direction, are formed side by side alternately in a circumferential direction on an outer periphery of the rotor 80. A rightward steering recessed part 810R and a leftward steering recessed part 810L (refer to FIG. 13), which are longitudinal grooves extending in the z axis direction, are formed side by side alternately in a circumferential direction on an inner periphery of the sleeve 81. A first fluid passage 811, a second fluid passage 812, a supply fluid passage 813, and a discharge fluid passage 814 are formed so as to cause the inner periphery and the outer periphery of the sleeve 81 to communicate to each other on a negative side in the z axis direction of the sleeve 81. The first fluid passage 811 opens on the leftward steering recessed part 810L. The second fluid passage 812 opens on the rightward steering recessed part 810R. The supply fluid passage 813 and the discharge fluid passage 814 open on a protruded part between the leftward steering recessed part 810L and the rightward steering recessed part 810R in the circumferential direction. The fluid passages 813 and 814 are alternately arranged in the circumferential direction.

The sleeve 81 is rotatably contained in the valve housing 112. A positive side in the z axis direction of the sleeve 81 is rotatably supported on an inner periphery of the valve housing 112 via a ball bearing 115. The sleeve 81 functions as an inner ring of the ball bearing 115. An outer periphery of the negative side in the z axis direction of the sleeve 81 opposes an inner periphery of a negative side in the z axis direction of the valve housing 112. Irrespective of a rotation position of the sleeve 81 with respect to the valve housing 112, the supply port 112a of the valve housing 112 communicates to the supply fluid passage 813 of the sleeve 81, the first port 112b of the valve housing 112 communicates to the first fluid passage 811 of the sleeve 81, the second fluid passage 812 of the sleeve 81 communicates to the second hydraulic chamber 72, and the discharge port 112c of the valve housing 112 communicates to the discharge fluid passage 814 of the sleeve 81. The rotor 80 is rotatably contained in the sleeve 81. The outer periphery of the rotor 80 opposes the inner periphery of the sleeve 81. The supply recessed part 801 or the discharge recessed part 802 of the rotor 80 opposes the protruded part between the leftward steering recessed part 810L and the rightward steering recessed part 810R of the sleeve 81 at a neutral position of the rotor 80 with respect to the sleeve 81. The opening of the supply fluid passage 813 opposes the supply recessed part 801 and the opening of the discharge fluid passage 814 opposes the discharge recessed part 802.

The second power steering mechanism 12 is of the electric type in which the power of the electric motor is directly used as a steering assist force. The second power steering mechanism 12 includes a second electric motor 5. The second electric motor 5 is a three-phase AC brushless motor, which is provided on the input shaft 21 and is connected to the input shaft 21. The second electric motor 5 has a hollow torus shape, and is arranged so as to surround at least a part in the axial direction of the input shaft 21 (in the broad sense). The second electric motor 5 is configured to generate a rotation torque, and control the torque of the input shaft 21 (intermediate shaft 23). The second electric motor 5 is arranged so as to overlap, in the z axis direction, with a part of the positive side in the z axis direction of the intermediate shaft 23 and a part of the negative side in the z axis direction of the input shaft 22 (in the narrow sense). The second electric motor 5 includes a motor component and a motor housing 50. The motor component includes a rotor 51 and a stator 52. The rotor 51 has a tubular shape, and fits to the outer periphery of the intermediate shaft 23 so as to surround the intermediate shaft 23. The rotor 51 is provided so as to be integrally rotatable with the intermediate shaft 23. Specifically, a tubular coupling member 51a fits to the outer periphery of the intermediate shaft 23. The coupling member 51a is configured to integrally rotate with the intermediate shaft 23 by a key coupling that uses a key 51b. The rotor 51 fits to an outer periphery of the coupling member 51a. The rotor 51 rotates integrally with the coupling member 51a (intermediate shaft 23). The stator 52 has a tubular shape, and is arranged on the outer periphery side of the rotor 51 so as to surround the rotor 51. An inner periphery of the stator 52 is arranged so as to be separated by a predetermined gap from an outer periphery of the rotor 51.

The motor housing 50 contains the motor component. The motor housing 50 includes a first housing 501 and a second housing 502. The first housing 501 has a bottomed tubular shape and has an opening on the negative side thereof in the z axis direction. The first housing 501 is fixed to the valve housing 112 via an adaptor member 50a. A flange part of the negative side in the z axis direction of the first housing 501 is fastened and fixed to the adaptor member 50a by bolts B1. The adaptor member 50a is fastened and fixed to the positive side in the z axis direction of the valve housing 112 by bolts B2. The rotor 51 and the stator 52 are contained on an inner periphery side of the first housing 501. An outer periphery of the stator 52 is fixed to the inner periphery of the first housing 501. The second housing 502 has a disc shape. The second housing 502 is fastened and fixed to the first housing 501 by bolts (not shown) so as to close the opening on the negative side in the z axis direction of the first housing 501. A hole 503 is formed on a bottom part of the positive side in the z axis direction of the first housing 501. An end of the positive side in the z axis direction of the coupling member 51a is arranged on an inner periphery side of the hole 503. A ball bearing 505 is provided as a first bearing between the inner periphery of the hole 503 and an outer periphery of the end of the coupling member 51a. The first housing 501 rotatably supports the end of the coupling member 51a via the ball bearing 505. A hole 504 is formed in the second housing 502. An end of the negative side in the z axis direction of the coupling member 51a is arranged on an inner periphery side of the hole 504. A ball bearing 506 is provided as a second bearing between the inner periphery of the hole 504 and an outer periphery of the end of the coupling member 51a. The second housing 502 rotatably supports the end of the coupling member 51a via the ball bearing 506.

A first resolver 91 is arranged on the positive side in the z axis direction of the first housing 501. The first resolver 91 includes a rotor 910 and a stator 911. The rotor 910 is provided so as to neighbor the positive side in the z axis direction of the ball bearing 505 and surround the outer periphery of the input shaft 22. The rotor 910 can rotate integrally with the input shaft 22. The stator 911 has a torus shape. A recessed part 507 is formed on the positive side in the z axis direction of the bottom part of the first housing 501 so as to surround the hole 503. The stator 911 is provided in the recessed part 507. An inner periphery of the stator 911 is arranged so as to be separated by a predetermined gap from an outer periphery of the rotor 910. The first resolver 91 is covered by a cover member 50b. The cover member 50b is fastened to the positive side in the z axis direction of the first housing 501 by bolts B3. A tubular part 509 is provided on the cover member 50b. The input shaft 22 is inserted into the inner periphery side of the tubular part 509. A seal member 50c is provided between the inner periphery of the tubular part 509 and the outer periphery of the input shaft 22. A second resolver 92 is arranged on the negative side in the z axis direction of the second housing 502. The second resolver 92 includes a rotor 920 and a stator 921. The rotor 920 is provided so as to neighbor the negative side in the z axis direction of the ball bearing 506 and surround the outer periphery of the negative side in the z axis direction of the coupling member 51a. The rotor 920 can rotate integrally with the coupling member 51a (intermediate shaft 23). The stator 921 has a torus shape. A recessed part 508 is formed on the negative side in the z axis direction of the second housing 502 so as to surround the hole 504. The stator 921 is provided in the recessed part 508. An inner periphery of the stator 921 is arranged so as to be separated by a predetermined gap from an outer periphery of the rotor 920.

The first resolver 91 is a first rotation angle sensor configured to detect a rotation angle (steering angle θ1) of the input shaft 22. θ1 is a rotation angle in the left/right steering direction while a neutral position (during no operation) of the steering wheel 200 is used as a reference. The second resolver 92 is a second rotation angle sensor configured to detect a rotation angle θ2 of the intermediate shaft 23. θ2 is a rotation angle in the left/right direction while a neutral position (during no rotation) of the intermediate shaft 23 is used as a reference. θ2 is also a rotation angle of the coupling member 51a, and is equivalent to the rotation angle of the rotor 51 of the second electric motor 5. Thus, the second resolver 92 also functions as a motor rotation sensor configured to detect the rotation angle (rotation position) of the rotor 51. When the steering torque is input to the input shaft 22, a rotation position relationship between the input shaft 22 and the intermediate shaft 23 changes due to the torsion of the second torsion bar 26. Thus, a difference between an output signal of the first resolver 91 and an output signal of the second resolver 92 represents a steering torque generated in the second torsion bar 26. The second torsion bar 26 is a torsion bar for a torque sensor.

Figure 3:
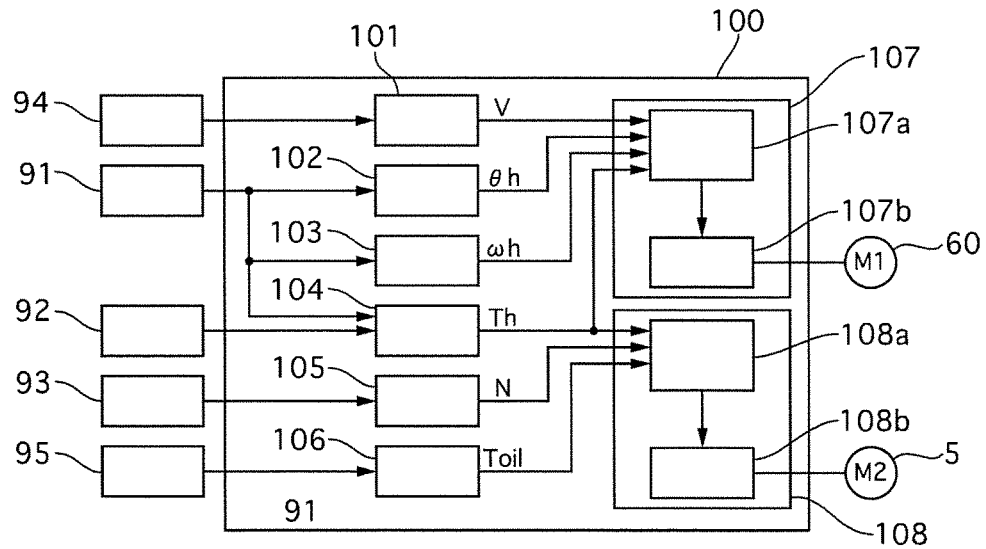
FIG. 3 is a diagram for illustrating a configuration of a control device in the power steering device according to the first embodiment.

Referring to FIG. 3, a description is now given of a configuration in terms of the control. FIG. 3 is a diagram for illustrating a configuration of the control device 100. Flows of signals are represented as arrows. Sensors 91 to 95 include the first resolver 91, the second resolver 92, a third resolver 93, a vehicle speed sensor 94, and a working fluid temperature sensor 95. The third resolver 94 is configured to detect the rotational angle of the output shaft of the first electric motor 60. The vehicle speed sensor 94 is configured to detect a speed (vehicle speed V) of the vehicle. The working fluid temperature sensor 95 is configured to detect a temperature Toil of the working fluid. On the control device 100, a microcomputer configured to control driving of the first and second electric motors 60 and 5 is installed. The control device 100 includes a vehicle speed signal reception part 101, a steering angle signal reception part 102, a steering speed signal reception part 103, a steering torque calculation part 104, a first motor revolution number signal reception part 105, a working fluid temperature signal reception part 106, a first electric motor control part 107, and a second electric motor control part 108.

The vehicle speed signal reception part 101 is configured to receive an output signal (signal of the vehicle speed V)

from the vehicle speed sensor 94 (in other words, the signal is input; the same holds true below). The steering angle signal reception part 102 is configured to receive an output signal (rotation angle signal of the input shaft 22, namely, a steering angle signal) from the first resolver 91. The stator 911 of the first resolver 91 is configured to output the signal in accordance with the rotation of the rotor 910. The steering angle signal reception part 102 is configured to receive the output signal via a wire, and calculate a steering angle θh based on this output signal. The steering speed signal reception part 103 is configured to receive the steering angle signal output from the first resolver 91. The steering speed signal reception part 103 is configured to receive the output signal via a wire, and calculate a steering speed ωh, which is a rotation speed (rotation angular velocity) of the input shaft, based on this output signal. For example, ωh can be calculated as a derivative of the steering angle θh based on a difference between a signal previously received and a signal currently received. The control device 100 (steering speed signal reception part 103) may be configured to receive a signal of the steering speed ωh from the outside.

The steering torque calculation part 104 is configured to calculate a steering torque Th generated in the second torsion bar 26 based on the output signal (rotation angle signal of the input shaft 22) from the first resolver 91 and the output signal (rotation angle signal of the intermediate shaft 23) from the second resolver 92. In other words, Th corresponds to the difference in the rotation angle between both the shafts 21 and 22, namely, the torsion amount of the second torsion bar 26. The stator 921 of the second resolver 92 is configured to output a signal in accordance with the rotation of the rotor 920. The steering torque calculation part 104 is configured to receive the output signal via a wire. Moreover, the steering torque calculation part 104 is configured to receive the output signal from the first resolver 91 via a wire. The steering torque calculation part 104 is configured to calculate the steering torque Th based on those output signals. The first motor revolution number signal reception part 105 is configured to receive the output signal from the third resolver 93. The first motor revolution number signal reception part 105 is configured to receive the output signal via a wire, and calculate a number of revolutions N of the first electric motor 60 based on this output signal. The working fluid temperature signal reception part 106 is configured to receive an output signal (signal of the temperature Toil) from the working fluid temperature sensor 95. A prediction part configured to predict the temperature Toil of the working fluid may be provided in the control device 100, and the working fluid temperature signal reception part 106 may be configured to receive a signal of the temperature Toil predicted by the prediction part.

Figure 4:
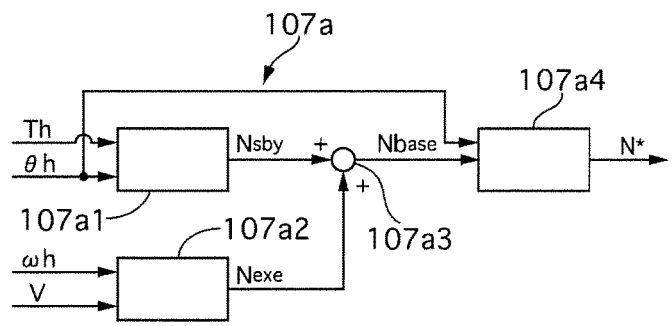
FIG. 4 is a diagram for illustrating a configuration of a target revolution number calculation part in a first electric motor control part of the first embodiment.
Figure 5:
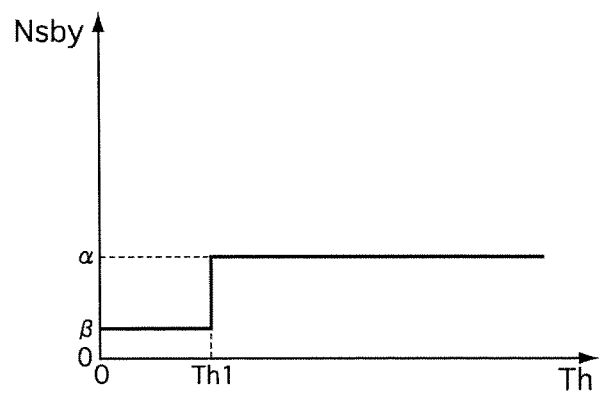
FIG. 5 is a map used by the target revolution number calculation part of the first embodiment to set a standby revolution number.

The first electric motor control part 107 is configured to control driving of the first electric motor 60 based on a driving state and a steering state of the vehicle. The first electric motor control part 107 includes a target revolution number calculation part 107a and a first motor drive circuit 107b. FIG. 4 is a diagram for illustrating a configuration of the target revolution number calculation part 107a. The target revolution number calculation part 107a includes a standby revolution number calculation part 107a1, an execution revolution number calculation part 107a2, an addition part 107a3, and a control part 107a4. The standby revolution number calculation part 107a1 is configured to calculate a standby revolution number Nsby based on the calculated steering angle θh and the steering torque Th. When the magnitude of θh is more than a first predetermined value θh1, the standby revolution number calculation part 107a1 does not calculate Nsby (that is, sets Nsby to 0). θh1 is a predetermined angle more than 0 (θh1>0). When the magnitude of θh is equal to or less than θh1, for example, the standby revolution number calculation part 107a1 uses a map illustrated in FIG. 5 to set Nsby based on Th. When the magnitude of Th is more than a first predetermined value Th1, the standby revolution number calculation part 107a1 sets Nsby to α. Th1 is a predetermined torque more than 0 (Th1>0). α is a predetermined number of revolutions more than 0 (α>0). When the magnitude of Th is equal to or less than Th1, the standby revolution number calculation part 107a1 sets Nsby to β. β is a predetermined number of revolutions less than α and more than 0 (α>β>0).

The execution revolution number calculation part 107a2 is configured to calculate an execution revolution number Nexe based on the received vehicle speed V and the calculated steering speed ωh. The execution revolution number calculation part 107a2 uses, for example, a map illustrated in FIG. 6 to set Nexe based on V and ωh. When ωh is less than a predetermined value ωh1, the execution revolution number calculation part 107a2 sets Nexe to 0. ωh1 is a predetermined speed more than 0 (ωh1>0). When ωh is equal to or more than ωh1, the execution revolution number calculation part 107a2 sets Nexe such that Nexe increases as ωh becomes higher. For example, Nexe is set to increase as ωh increases (in proportion to ωh). Moreover, when ωh is equal to or more than ωh1, the execution revolution number calculation part 107a2 sets Nexe such that Nexe decreases (the gradient of a straight line of a graph of FIG. 6 decreases) as V becomes higher. The addition part 107a3 is configured to add the calculated Nsby and Nexe to each other, thereby calculating a base target revolution number Nbase of the first electric motor 60. The restriction part 107a4 is configured to set the calculated Nbase as a final target revolution number N* of the first electric motor 60 when the magnitude of θh is more than a second predetermined value θh2. θh2 is a predetermined angle more than 0 and less than θh1 (θh1>θh2>0). When the magnitude of θh is equal to or less than θh2, the restriction part 107a4 decreases N* from the calculated Nbase. Specifically, the restriction part 107a4 sets N* to 0.

The first motor drive circuit 107b is an inverter circuit including a field effect transistor FET as a switching device, and is configured to control a current supply amount to the first electric motor 60 so as to achieve the target revolution number N*.

The second electric motor control part 108 is configured to control the driving of the second electric motor 5 based on the driving state and the steering state of the vehicle. The second electric motor control part 108 includes a target torque calculation part 108a and a second motor drive circuit 108b. The target torque calculation part 108a is configured to calculate a target torque Tm* of the second electric motor 5 based on the calculated steering torque Th and the number of revolutions N of the first electric motor 60. The target torque calculation part 108a uses, for example, a map illustrated in FIG. 7 to set Tm* based on Th and N. When the number of revolutions N of the first electric motor 60 is more than a first predetermined value N1, the target torque calculation part 108a does not calculate the target torque Tm* (that is, sets Tm* to 0). N1 is a predetermined number of revolutions more than 0 (N1>0). When N is equal to or less than N1, and Th is less than a second predetermined value Th2, the target torque calculation part 108a sets Tm* to 0. Th2 is a predetermined torque more than 0 (Th2>0). When Th is equal to or more than Th2, and is equal to or less than a third predetermined value Th3, the target torque calculation part 108a sets Tm* such that Tm* increases as Th becomes higher. For example, Tm* is set to increase as Th increases (in proportion to Th). Th3 is a predetermined torque more than Th2 (Th3>Th2). When Th is more than Th3, Tm* is set to a constant maximum value. When N is equal to or less than N1, and is equal to or more than a second predetermined value N2, the target torque calculation part 108a sets Tm* such that Tm* decreases (the gradient of a straight line of from Th2 to Th3 of the graph of FIG. 7 decreases) as N becomes higher. N2 is a predetermined number of revolutions equal to or more than 0 and less than N1 (N1>N2≥0).

Figure 7:
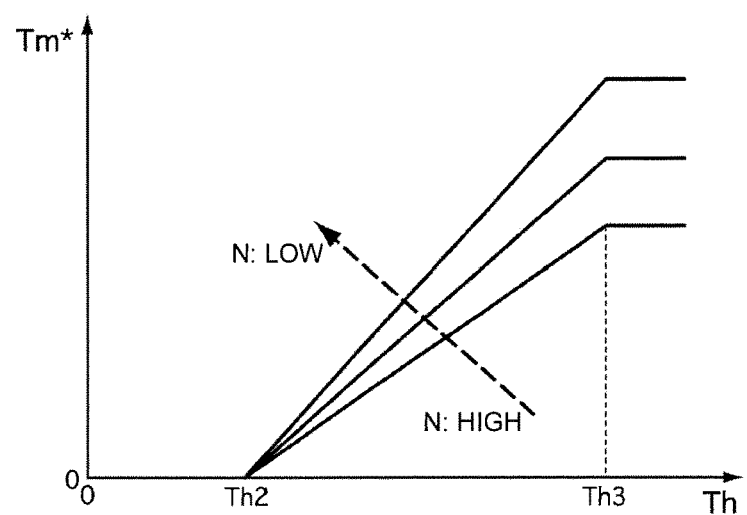
FIG. 7 is a map used by a second electric motor control part of the first embodiment to set a target torque.
Figure 8:
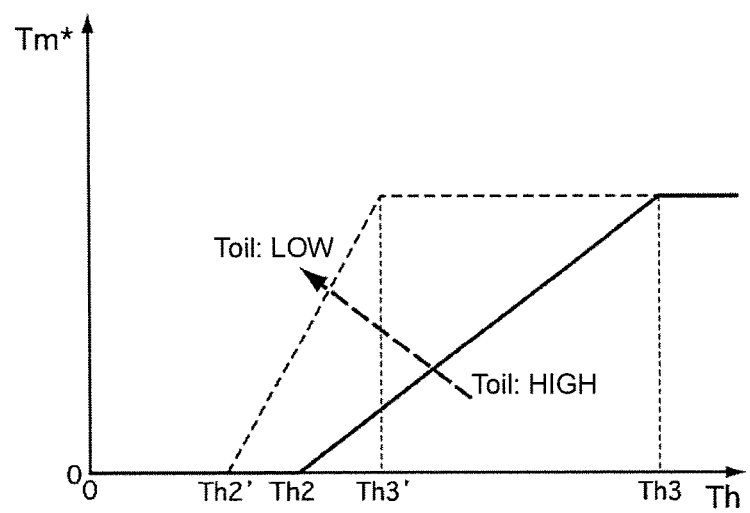
FIG. 8 is a map used by the second electric motor control part of the first embodiment to set the target torque based on a temperature of working fluid.

The target torque calculation part 108a is configured to correct the map of FIG. 7 based on the received temperature Toil of the working fluid. The target torque calculation part 108a is configured to set Tm* such that Tm* increases as Toil becomes lower for the same Th. For example, as illustrated in FIG. 8, Th2 and Th3 are each decreased, and the gradient of the straight line of from Th2 to Th3 of each graph (for each N) of FIG. 7 is increased in accordance with decrease of Toil.

The second motor drive circuit 108b is an inverter circuit including a FET as a switching device, and is configured to control a current supply amount to the second electric motor 5 (stator 52) so as to achieve the target torque Tm*.

A description is now given of actions and effects. The first power steering mechanism 11 is configured to use the first electric motor 60 to rotate the pump device 61, thereby supplying the working fluid from the pump device 61 to the power cylinder 7. The working fluid discharged from the pump device 61 is supplied to the hydraulic chambers 71 and 72 of the power cylinder 7, thereby generating the hydraulic pressures. Those hydraulic pressures act on the piston 70 (nut 301). A hydraulic pressure difference between the hydraulic chambers 71 and 72 generates a force of moving the piston 70 in the z axis direction. As a result, a turning assist force (steering assist force of assisting the steering force) for assisting the turning of the steered wheels 45 is generated, resulting in a decrease in force of operating the steering wheel 200 by the driver.

The rotary valve 8 is configured to switch the fluid passage and control the hydraulic pressure. Specifically, when the torque is input to the input shaft 21 (intermediate shaft 23), the rotation position of the rotor 80 is changed with respect to the sleeve 81 by the torsion of the first torsion bar 25. As a result, a supply destination of the working fluid from the pump device 61 and a discharge source of the working fluid to the reservoir tank 62 are switched between the first hydraulic chamber 71 and the second hydraulic chamber 72. For example, the rotor 80 rotates in one direction (leftward steering direction) from the neutral position with respect to the sleeve 81. At this time, an opening degree of a narrowed part between the supply recessed part 801 of the rotor 80 and the leftward steering recessed part 810L of the sleeve 81 increases. On the other hand, an opening degree of a narrowed part between the supply recessed part 801 of the rotor 80 and the rightward steering recessed part 810R of the sleeve 81 decreases. As a result, a supply amount of the working fluid from the pump device 61 to the first hydraulic chamber 71 increases while a supply amount of the working fluid from the pump device 61 to the second hydraulic chamber 72 decreases. Moreover, an opening degree of a narrowed part between the discharge recessed part 802 of the rotor 80 and the leftward steering recessed part 810L of the sleeve 81 decreases. On the other hand, an opening degree of a narrowed part between the discharge recessed part 802 of the rotor 80 and the rightward steering recessed part 810R of the sleeve 81 increases. As a result, a discharge amount of the working fluid from the first hydraulic chamber 71 to the reservoir tank 62 decreases, while a discharge amount of the working fluid from the second hydraulic chamber 72 to the reservoir tank 62 increases. Thus, the hydraulic pressure in the first hydraulic chamber 71 becomes higher than the hydraulic pressure in the second hydraulic chamber 72. This hydraulic pressure difference causes the piston 70 to push toward a direction in which the volume of the first hydraulic chamber 71 increases, thereby generating a force (steering force) of turning the steered wheels 45 toward the left direction. When the rotor 80 rotates from the neutral position toward another direction (rightward steering direction) with respect to the sleeve 81, a force (steering force) of turning the steered wheels 45 toward the right direction is also generated in the same way.

A torque is input to the input shaft 21 (intermediate shaft 23) based on the steering force of the driver or the rotation torque of the second electric motor 5. The rotary valve 8 opens or closes in response to this input as described above, resulting in the supply or discharge of the hydraulic pressures to/from the power cylinder 7. As a result, when the manual steering by the driver is carried out, the steering assist in accordance with the steering operation is carried out. The torsion amount of the first torsion bar 25 becomes larger as the torque input to the input shaft 21 (intermediate shaft 23) becomes larger. Thus, in the rotary valve 8, the rotation amount of the rotor 80 with respect to the sleeve 81 is large, and the degrees of the opening/closing of the narrowed parts between the recessed parts are large. Therefore, the hydraulic pressure difference between the hydraulic chambers 71 and 72 increases, and the steering assist force by the first power steering mechanism 11 is also large. Moreover, the working fluid amount discharged by the pump device 61 becomes larger as the output (number of revolutions N) of the first electric motor 60 becomes larger. Thus, the hydraulic pressure difference between the hydraulic chambers 71 and 72 increases, and the steering assist force by the first power steering mechanism 11 is also large.

Meanwhile, the hollow second electric motor 5, which is connected to the input shaft 21, and is provided so as to surround the at least part of the input shaft 21 in the axial direction, can apply desired rotation torque to the input shaft 21 (intermediate shaft 23). The second electric motor control part 108 can control the driving of the second electric motor 5 based on the driving information (driving state of the vehicle) from the various sensors, thereby controlling the torque of the input shaft 21 (steering shaft 20). As a result, the second power steering mechanism 12 can be used to carry out the steering assist according to the steering operation as well as automatic steering for parking, lane keeping, and the like. The input shaft 21 to which the second electric motor 5 applies the rotation torque may not be divided into the input shaft 22 (in the narrow sense) and the intermediate shaft 23.

In the device 1, the input shaft 21 is divided into the input shaft 22 (in the narrow sense) and the intermediate shaft 23. The input shaft 22 and the intermediate shaft 23 are coupled to each other via the second torsion bar 26, and the intermediate shaft 23 and the output shaft 24 are coupled to each other via the first torsion bar 25. In other words, the intermediate shaft 23 is arranged between the first torsion bar 25 and the second torsion bar 26. The second torsion bar 26 is arranged between the input shaft 22 and the first torsion bar 25 (which rotates as the intermediate shaft 23 rotates). In other words, the device 1 includes the second torsion bar 26 for detecting the steering torque Th independently of the first torsion bar 25 for opening and closing the rotary valve 8. The control device 100 includes the steering torque calculation part 104. The steering torque calculation part 104 is configured to calculate the steering torque Th generated in the second torsion bar 26, based on the output signal (rotation angle signal of the input shaft 22) from the first resolver 91 and the output signal (rotation angle signal of the intermediate shaft 23) from the second resolver 92. Thus, the control device 100 can carry out the steering force application control based on the steering torque Th. The rigidity (spring constant) of the torsion bar 26 can be set so as to be appropriate for the detection (calculation of Th by the steering torque calculation part 105) of Th. Meanwhile, the rigidity (spring constant) of the first torsion bar 25 can be set so as to be appropriate for the opening and closing of the rotary valve 8. Thus, highly precise detection of Th and highly precise opening and closing of the rotary valve 8 (control of the hydraulic pressure difference between the hydraulic chambers 71 and 72) can simultaneously be realized. The output signal from the second resolver 92 does not include a torsion component of the first torsion bar 25. Thus, the rotation angle of the rotor 51 of the second electric motor 5 can more precisely be detected.

The first electric motor control part 107 is configured to control driving of the first electric motor 60, thereby carrying out the steering assist by using the hydraulic pressure of the power cylinder 7. Specifically, the first electric motor control part 107 controls driving of the first electric motor 60 based on the steering speed $\omega h$ and the steering torque Th. $\omega h$ is a value indicating a flowrate necessary for the hydraulic chambers 71 and 72 inside the power cylinder 7 (flowrate required by the power cylinder 7 per unit time). The required flowrate becomes higher as $\omega h$ becomes higher. Thus, driving of the first electric motor 60 is controlled in accordance with $\omega h$, namely, the required flowrate. As a result, electric power consumption for controlling driving of the first electric motor 60 can be suppressed, thereby carrying out efficient steering control. Thus, an energy saving effect can be acquired. Moreover, Th is a value representing a steering intention (steering force) of the driver, and represents a responsiveness (steering responsiveness) required in the steering assist. Thus, driving of the first electric motor 60 is controlled in accordance with a value of Th, namely, the steering intention of the driver. As a result, the steering control can be carried out in accordance with the steering intention. Thus, steering feeling can be increased. In the first embodiment, driving of the first electric motor 60 is controlled in accordance with both $\omega h$ and Th. As a result, a more appropriate steering force can be applied. A specific description is now given of this point.

Figure 6:
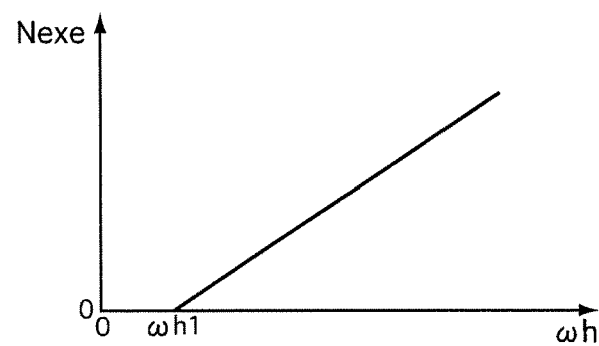
FIG. 6 is a map used by the target revolution number calculation part of the first embodiment to set an execution revolution number.

The first electric motor control part 107 is configured to control driving of the first electric motor 60 such that the number of revolutions N increases as $\omega h$ becomes higher, and such that N increases as the vehicle speed V becomes lower. In other words, the execution revolution number calculation part 107a2 sets Nexe such that the execution revolution number Nexe increases as $\omega h$ becomes higher, and such that Nexe increases as the vehicle speed V becomes lower. The first motor drive circuit 107b is configured to control a current supply amount to the first electric motor 60 so as to achieve the set Nexe. The execution revolution number calculation part 107a2 and the first motor drive circuit 107b function as a steering assist execution part in this way. The required flowrate becomes higher as $\omega h$ becomes higher and as V becomes lower. Thus, the first electric motor 60 is rotated in accordance with $\omega h$ or V, that is, in accordance with the degree of the required flowrate. As a result, electric power consumption for controlling driving of the first electric motor 60 can be suppressed. The characteristic of the graph of the map for setting Nexe is not limited to that of FIG. 6. For example, the characteristic may be such a characteristic that Nexe immediately increases to a predetermined value when $\omega h$ becomes more than $\omega h1$, and then gradually increases as $\omega h$ increases, or such a characteristic that the graph of FIG. 6 is translated in parallel. Moreover, the graph of FIG. 6 may be set to be translated in parallel toward the decrease side of Nexe when V becomes higher.

The first electric motor control part 107 is configured to stop the first electric motor 60 when $\omega h$ is less than $\omega h1$. In other words, the execution revolution number calculation part 107a2 sets Nexe to 0 when the magnitude of $\omega h$ is less than $\omega h1$. The first electric motor 60 is stopped in this way when $\omega h$ is less than $\omega h1$, that is, when a high flowrate is not necessary in the power cylinder 7. As a result, an effect of suppressing the electric power consumption, namely, the energy saving effect can be increased. Moreover, the region in which $\omega h$ is less than $\omega h1$ is a dead zone of the first electric motor 60, and frequent switching of the first electric motor 60 between the driving and the stopping can thus be suppressed.

The first electric motor control part 107 is configured to control driving of the first electric motor 60 such that the number of revolutions N decreases when $\theta h$ is equal to or less than $\theta h2$. Specifically, when the magnitude of $\theta h$ is equal to or less than $\theta h2$, the restriction part 107a4 decreases the target revolution number N* to less than the target revolution number Nbase, which is a target value in the case where the magnitude of $\theta h$ is more than $\theta h2$. In other words, when $\theta h$ is equal to or less than $\theta h2$, a high flowrate is not necessary in the power cylinder 7. In this case, N is decreased. As a result, the electric power consumption for controlling driving of the first electric motor 60 can be suppressed. Specifically, the first electric motor control part 107 stops the first electric motor 60 when $\theta h$ is equal to or less than $\theta h2$. In other words, the restriction part 107a4 sets N* to 0 when the magnitude of $\theta h$ is equal to or less than $\theta h2$. The first electric motor 60 is stopped when a high flowrate is not necessary in the power cylinder 7 in this way. As a result, the effect of suppressing the electric power consumption, namely, the energy saving effect can be increased. Moreover, the region in which $\theta h$ is equal to or less than $\theta h2$ is a dead zone of the first electric motor 60, and frequent switching of the first electric motor 60 between the driving and the stopping can thus be suppressed.

On the other hand, when $\theta h$ is equal to or less than $\theta h1$, the first electric motor control part 107 controls driving of the first electric motor 60 so as to continue the rotation under a state in which the number of revolutions N is equal to or less than the predetermined value Nsby. In other words, the standby revolution number calculation part 107a1 sets the standby revolution number Nsby when the magnitude of $\theta h$ is equal to or less than $\theta h1$. The first motor drive circuit 107b is configured to control the current supply amount to the first electric motor 60 so as to achieve the set Nsby. As a result, the first electric motor 60 is controlled so as to continue to rotate under the state in which N is equal to or less than Nsby regardless of the steering speed $\omega h$ and the vehicle speed V when the magnitude of $\theta h$ is equal to or less than $\theta h1$ (and more than $\theta h2$). In other words, a high flowrate is not required on the side of the power cylinder 7 when $\theta h$ is equal to or less than $\theta h1$. Thus, the first electric motor 60 is caused to rotate at the low rotation (standby rotation) in advance in preparation for a case where θh increases or the like before the steering assist is carried out in accordance with ωh and the like. As a result, the responsiveness (steering responsiveness) of the steering assist can be increased while the electric power consumption is suppressed. The standby revolution number calculation part 107a1 and the first motor drive circuit 107b function as a standby rotation control part.

The standby rotation control part is configured to variably control the number of revolutions (standby revolution number Nsby) of the first electric motor 60 based on Th under the state in which θh is equal to or less than θh1. In other words, the standby revolution number calculation part 107a1 calculates Nsby based on Th. As described above, Th reflects the steering intention of the driver. When Th is low, that is, the driver does not intend steering, the flowrate is not required on the side of the power cylinder 7. Thus, the number of revolutions N of the first electric motor 60 may be decreased. In this case, Nsby is decreased. As a result, the electric power consumption can more effectively be suppressed, thereby attaining a higher energy saving effect. On the other hand, when Th is detected, Nsby is increased. As a result, the steering responsiveness can be secured. Th can be detected at a timing earlier than that of θh. Thus, Nsby can be variably controlled at an earlier timing based on Th. Thus, the above-mentioned respective effects can be improved.

Specifically, the standby rotation control part controls driving of the first electric motor 60 such that the number of revolutions N decreases when θh is equal to or less than θh1, and Th is equal to or less than Th1. In other words, when θh is equal to or less than θh1, and the magnitude of Th is equal to or less than Th1, the standby revolution number calculation part 107a1 sets Nsby to β, which is less than α in the case where the magnitude of Th is more than Th1. In other words, when the magnitude of Th is equal to or less than Th1, it can be determined that the driver does not intend steering, that is, the flowrate is not required on the side of the power cylinder 7. Thus, Nsby is decreased. As a result, further energy saving effects can be acquired. β may be 0. In other words, the standby rotation control part may be configured to stop the first electric motor 60 when θh is equal to or less than θh1, and Th is equal to or less than Th1.

Moreover, the standby rotation control part is configured to control driving of the first electric motor 60 such that the number of revolutions N increases when θh is equal to or less than θh1, and Th is equal to or more than Th1. In other words, when θh is equal to or less than θh1, and the magnitude of Th is more than Th1, the standby revolution number calculation part 107a1 sets Nsby to α, which is more than β in the case where the magnitude of Th is equal to or less than Th1. As described above, a high flowrate is not required on the side of the power cylinder 7 when θh is equal to or less than θh1. However, Th has increased. Therefore, Nsby is increased. As a result, the preparation for the case where θh increases can be made more reliably. Th1 when Nsby is switched from α to β and Th1 when Nsby is switched from β to α may be values different from each other. In this case, frequent switching of Nsby can be suppressed.

The second electric motor control part 108 is configured to control driving of the second electric motor 5, thereby carrying out the steering assist by using the rotation torque of the second electric motor 5. The second electric motor control part 108 is configured to control driving of the second electric motor 5 based on Th. Specifically, the target torque calculation part 108a calculates the target torque Tm* of the second electric motor 5 based on Th. The second motor drive circuit 108b controls the current supply amount to the second electric motor 5 so as to achieve Tm*. Driving of the second electric motor 5 is controlled based on Th, that is, in accordance with the steering intention of the driver in this way. As a result, the steering force more closely following the steering intention of the driver can be applied while the electric power consumption for controlling driving of the second electric motor 5 is suppressed. The characteristic of the graph of the map for setting Tm* is not limited to that of FIG. 7. For example, the characteristic may be such a characteristic that Tm* immediately increases to a predetermined value when Th becomes more than Th2, and then gradually increases as Th increases, or such a characteristic that the graph of FIG. 7 is translated in parallel.

Specifically, the second electric motor control part 108 stops the second electric motor 5 when Th is less than Th2. In other words, the target torque calculation part 108a sets Tm* to 0 when Th is less than Th2. In this way, the second electric motor 5 is stopped when Th is less than Th2, that is, when it can be determined that the driver does not intend steering. As a result, the electric power consumption can be suppressed to increase the energy saving effect. Moreover, the region in which Th is less than Th2 is a dead zone of the second electric motor 5, and frequent switching of the second electric motor 5 between the driving and the stopping can thus be suppressed.

Moreover, the second electric motor control part 108 is configured to control driving of the second electric motor 5 in accordance with the driving state of the first electric motor 60. As a result, the control that uses the pump device 61 by the first electric motor 60 and the control by the second electric motor 5 can be caused to cooperate with and complement each other. Thus, an increase in energy saving performance and an increase in the steering feeling can simultaneously be realized. For example, the second electric motor control part 108 controls driving of the second electric motor 5 when θh is equal to or less than θh1, and Th is equal to or more than Th2. In other words, driving of the second electric motor 5 is controlled based on an increase in Th during the standby rotation control for the first electric motor 60. As a result, while the energy saving effect is acquired by the standby rotation control, the steering force can be applied in accordance with Th. For example, when a high flowrate is not required in the power cylinder 7 but the steering force for holding the steering wheel is required to be applied as in the steering wheel holding, an increase in steering load on the driver can be suppressed by the control of driving of the second electric motor 5 while the energy saving effect is acquired by the standby rotation control by the first electric motor 60. Th2 when the second electric motor 5 is switched from the stop state to the drive control and Th1 when Nsby is switched from β to α may be the same values or different values.

Moreover, the second electric motor control part 108 is configured to output a control signal for controlling driving of the second electric motor 5 based on a signal of the number of revolutions N of the first electric motor 60. Specifically, the target torque calculation part 108a calculates Tm* based on N. The second motor drive circuit 108b is configured to control the current supply amount to the second electric motor 5 so as to achieve Tm*. The control of using the pump device 61 by the first electric motor 60 and the control by the second electric motor 5 can be caused to effectively cooperate with each other in this way by controlling driving of the second electric motor 5 based on N, which is the output of the first electric motor 60.

Figure 9:
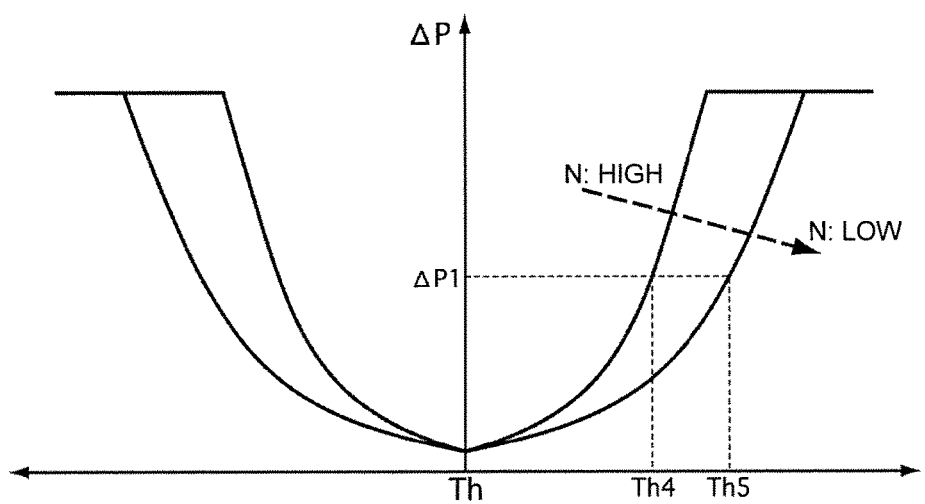
FIG. 9 is a graph for showing a relationship between a steering torque and a hydraulic pressure difference generated in a power cylinder in the power steering device according to the first embodiment.

FIG. 9 is a graph for showing a relationship between the steering torque Th and the hydraulic pressure difference ΔP (namely, the steering force by the power cylinder 7) between the hydraulic chambers 71 and 72 generated in the power cylinder 7. The graph of FIG. 9 is offset toward a decrease side of ΔP in a case where N is low (the fluid amount discharged by the pump device 61 is small) compared with a case where N is high (the fluid amount is large). In other words, there is provided such a characteristic that ΔP decreases for the same value of Th as N becomes lower. In other words, Th5, which is more than Th4 in the case where N is high, is required for generating the same ΔP1 in the case where N is low. In order to handle this state, the second electric motor control part 108 is configured to control driving of the second electric motor 5 when N is equal to or less than a predetermined value N1. In other words, the target torque calculation part 108a calculates the target torque Tm* of the second electric motor 5 when N is equal to or less than N1. The steering force by the power cylinder 7 may be insufficient under the state in which N is low as described above. When N is equal to or less than N1, the steering force by the power cylinder 7 can be determined to be insufficient. Thus, the steering force Tm is generated by the second electric motor 5. As a result, a decrease amount of the steering force by the power cylinder 7 caused by the decrease in N can be compensated. Thus, the steering responsiveness can be secured.

On the other hand, the second electric motor control part 108 is configured to stop the second electric motor 5 when N is more than N1. In other words, the target torque calculation part 108a does not calculate Tm* when N is more than N1 (set Tm* to zero). In other words, when N is more than N1, the steering force by the power cylinder 7 can be determined to be sufficiently applied. Thus, the second electric motor 5 is stopped. As a result, the energy saving effect can be increased. The second electric motor control part 108 may be configured to decrease the rotation torque Tm of the second electric motor 5 in the case where N is more than N1 compared with the case where N is equal to or less than N1. Also in this case, the energy saving effect can be increased. According to the first embodiment, when N is more than N1, the second electric motor 5 is stopped. As a result, the energy saving effect can further be increased.

The second electric motor control part 108 is configured to control driving of the second electric motor 5 such that Tm decreases as N increases when N is equal to or more than a second predetermined value N2 (<N1). In other words, the target torque calculation part 108a sets Tm* such that Tm* decreases as N becomes higher (Tm* increases as N becomes lower) when N is equal to or more than N2. In other words, as illustrated in FIG. 9, the change in N reflects the change in the steering force (LP) by the power cylinder 7. Thus, the rotation torque Tm of the second electric motor 5 is adjusted in accordance with (the change in) N. As a result, the change in the steering force by the power cylinder 7 can be compensated (or cancelled) by the steering force Tm by the second electric motor 5. For example, when N is high, the steering force by the power cylinder 7 is large, and the steering force Tm by the second electric motor 5 is thus decreased. On the other hand, even when N decreases and Th required for generating ΔP1 thus increases, for example, from Th4 to Th5, the driver can perform the steering while Th remains at Th4 if Tm* is set to the increase amount of from Th4 to Th5. Thus, in the device 1 as a whole, while the electric power consumption is suppressed, the steering force can be secured. Thus, the energy saving effect and an effect of increasing the steering feeling can simultaneously be increased further. The graph of FIG. 7 may be set to be translated in parallel toward the decrease side of Tm* in the case where N is high compared with the case where N is low.

When the temperature Toil of the working fluid is low, the viscosity of the working fluid is high. In FIG. 9, when Toil is low, the steering force (ΔP) by the power cylinder 7 has such a characteristic as to decrease similarly to the case where N is low. Therefore, a torque loss occurs, and responsiveness of the steering force application by the power cylinder 7 may decrease. The steering torque required to be applied by the driver increases, and, for example, the driver may not steer the steering wheel to the end. In order to handle this state, the second electric motor control part 108 is configured to control driving of the second electric motor 5 such that the rotation torque Tm of the second electric motor 5 increases as Th becomes higher. In other words, the target torque calculation part 108a sets Tm* such that Tm* increases as Th becomes higher, based on the characteristic of FIG. 7. Thus, when Toil is low, Th increases, and a high Tm is generated. As a result, Tm is generated in the direction of compensating the decrease (increase in the steering torque) in the responsiveness caused by the decrease in Toil. As a result, the steering torque required to be applied by the driver decreases. Thus, the steering responsiveness can be secured regardless of whether the Toil is high or low.

Moreover, the second electric motor control part 108 is configured to control driving of the second electric motor 5 based on a signal of Toil. In other words, the target torque calculation part 108a sets Tm* based on Toil. Specifically, the target torque calculation part 108a corrects the characteristic of FIG. 7 while using Toil as a parameter (FIG. 8). As a result, Tm for compensating the decrease in the responsiveness caused by the decrease in Toil can more effectively be generated, resulting in a more appropriate result. Specifically, the second electric motor control part 108 controls driving of the second electric motor 5 such that Tm increases as Toil decreases. The target torque calculation part 108a is configured to set Tm* such that Tm* increases as Toil becomes lower. The steering force can more appropriately be applied by controlling driving of the second electric motor 5 based on Toil in this way. For example, even when Toil decreases and Th required for generating ΔP1 in FIG. 9 increases from Th4 to Th5, the driver can perform the steering while Th remains at Th4 if Tm* is set so that Tm increases by the increase amount of from Th4 to Th5. In the case where Toil is low, the region of from Th2 to Th3 of the graph of FIG. 7 may be set to be translated in parallel toward an increase side (leftward direction of FIG. 7) of Tm* compared with the case where Toil is high. Alternatively, while the region of from Th2 to Th3 of FIG. 7 is fixed independently of Toil, the gradient of the straight line graph in the region of from Th2 to Th3 may be set to increase in the case where Toil is low compared with the case where Toil is high. According to the first embodiment, the above-mentioned two setting methods are combined to decrease Th2 and Th3 respectively and increase the gradient of the straight line of from Th2 to Th3 in each graph (for each N) of FIG. 7 as Toil decreases, as illustrated in FIG. 8. As a result, the characteristic of the change in ΔP with respect to the change in Th in FIG. 9 is simulated. Tm for compensating the decrease in the responsiveness caused by the decrease in Toil can more effectively be generated.

Second Embodiment

First, a description is given of the configuration of the power steering device 1 according to a second embodiment.

Figure 10:
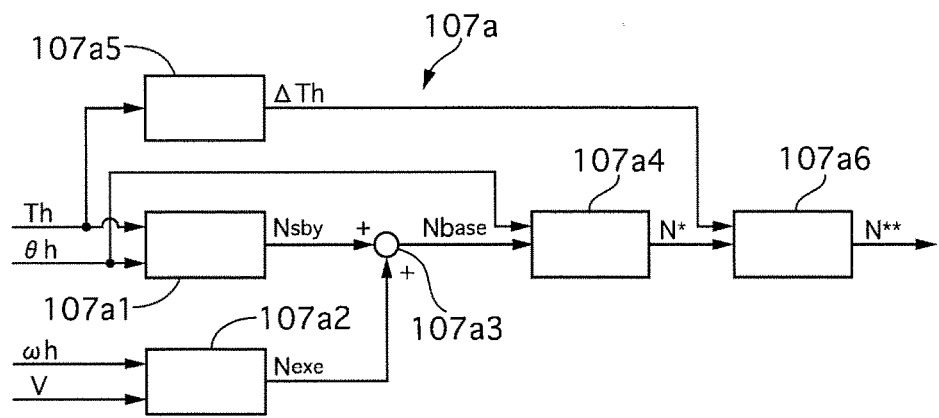
FIG. 10 is a diagram for illustrating a configuration of a target revolution number calculation part in a first electric motor control part of a second embodiment.

Components common to the first and second embodiments are denoted by the same reference numerals as those of the first embodiment, and a description thereof is omitted here. Only the components different from those of the first embodiment are described. FIG. 10 is a diagram for illustrating the configuration of the target revolution number calculation part 107*a* in the first electric motor control part 107. The target revolution number calculation part 107*a* includes a steering torque change amount calculation part 107*a*5 and a target revolution number correction part 107*a*6. The steering torque change amount calculation part 107*a*5 is configured to calculate a change amount $\Delta$Th of the steering torque Th in a predetermined period based on the calculated steering torque Th. For example, $\Delta$Th can be calculated as a change rate of Th by acquiring an arithmetic average of Ths calculated a plurality of times in a predetermined period. The method of calculating $\Delta$Th is not limited to this method.

The target revolution number correction part 107*a*6 is configured to correct N* based on the calculated $\Delta$Th. In other words, when $\Delta$Th is equal to or more than a predetermined value $\Delta$Th1, the target revolution number correction part 107*a*6 determines that abrupt steering has occurred, and resets N* to a predetermined large constant value. This N* is set to a final target revolution number N. The above-mentioned constant value is, for example, the maximum revolution number Nmax in a rating of the first electric motor 60. $\Delta$Th1 is a predetermined value more than 0. When $\Delta$Th is less than $\Delta$Th1, the target revolution number correction part 107*a*6** determines that the steering is not abrupt steering (is normal steering), and directly uses N* as the final target revolution number N**.

Figure 11:
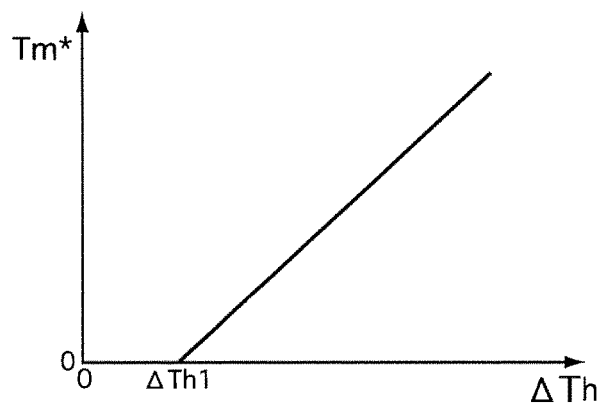
FIG. 11 is a map used by a second electric motor control part of the second embodiment to set a target torque.

The target torque calculation part 108*a* in the second electric motor control part 108 is configured to calculate the target torque Tm* of the second electric motor 5 based on the calculated $\Delta$Th. The target torque calculation part 108*a* uses, for example, a map illustrated in FIG. 11. When $\Delta$Th is less than $\Delta$Th1, the target torque calculation part 108*a* sets Tm* to 0. When $\Delta$Th is equal to or more than $\Delta$Th1, the target torque calculation part 108*a* sets Tm* such that Tm* increases as Th becomes higher. For example, Tm* is set to increase as $\Delta$Th increases (in proportion to $\Delta$Th). The characteristic of the graph of the map for setting Tm* is not limited to that of FIG. 11. For example, the characteristic may be such that Tm* immediately increases to a predetermined value when $\Delta$Th becomes more than $\Delta$Th1, and then, Tm* gradually increases as $\Delta$Th increases, or the like. Moreover, $\Delta$Th1 in the target torque calculation part 108*a* of the second electric motor control part 108 may be a value that is the same as or different from $\Delta$Th1 in the target revolution number calculation part 107*a* of the first electric motor control part 107. The other configuration is the same as that of the first embodiment.

Figure 12:
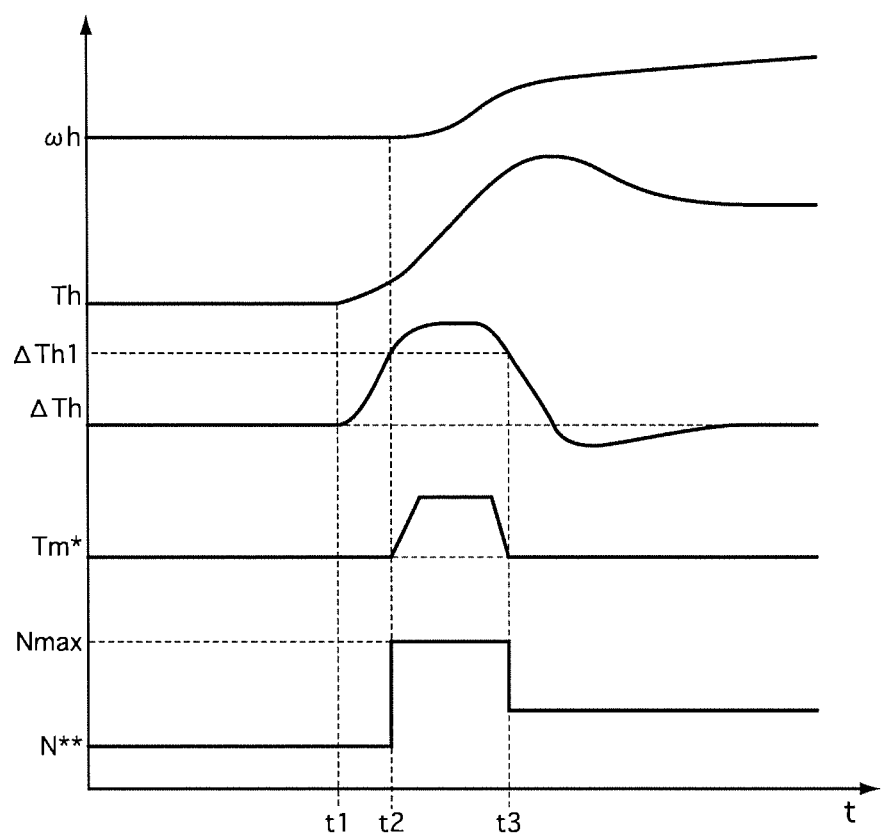
FIG. 12 is a graph for showing temporal changes in respective variables during abrupt steering in the second embodiment.

A description is now given of actions and effects. FIG. 12 is a time chart for illustrating temporal changes in respective variables when such abrupt steering that the steering wheel 200 is steered from a hold state toward one of the steering directions occurs. The steering wheel 200 is held under the normal steering until a time point t1. The steering speed $\omega$h is 0. The steering torque Th is constant. The change amount $\Delta$Th of the steering torque Th is 0. $\Delta$Th is less than $\Delta$Th1, and Tm* is thus 0. In other words, driving of the second electric motor 5 is not controlled. On the other hand, $\omega$h is 0, and N is thus set to the standby revolution number Nsby calculated based on $\theta$h and Th. Driving of the first electric motor 60 is controlled so as to attain N. At a time point t1, abrupt steering is started. Until a time point t2, Th increases before $\omega$h increases. $\Delta$Th increases from 0. At the time point t2, $\Delta$Th becomes equal to or more than $\Delta$Th1. Thus, the steering is determined to be abrupt steering. Thus, Tm* more than 0 is set, and the drive control for the second electric motor 5 (output of the second electric motor 5) is started. Moreover, N is set to the maximum revolution number Nmax, thereby maximizing the number of revolutions N (output) of the first electric motor 60**. Tm* according to the magnitude of $\Delta$Th is set from the time point t2 to a time point t3. Moreover, N** is maintained to be Nmax. At the time point t3, $\Delta$Th becomes equal to or less than $\Delta$Th1. Thus, the steering is determined not to be abrupt steering. Tm* is returned to 0, and the drive control for the second electric motor 5 is finished (the output of the second electric motor 5 is stopped). Moreover, N is set to a predetermined value according to $\omega$h and the like, and then, the drive control for the first electric motor 60** is continued.

As described above, the first electric motor control part 107 is configured to control driving of the first electric motor 60 in accordance with $\Delta$Th. In other words, the target revolution number correction part 107*a*6 corrects N* based on $\Delta$Th, and set the corrected N* as the final target revolution number N. In this way, a steering force more closely following the steering intention of the driver can be applied by controlling driving of the first electric motor 60 in accordance with $\Delta$Th, namely, the increase/decrease in Th. Specifically, the first electric motor control part 107 controls driving of the first electric motor 60 such that the number of revolutions N of the first electric motor 60 increases when $\Delta$Th is equal to or more than the predetermined value $\Delta$Th1. In other words, the target revolution number correction part 107*a*6** resets N* to the predetermined large constant value when $\Delta$Th is equal to or more than $\Delta$Th1, and sets this N* as the final target revolution number N. When $\Delta$Th is equal to or more than $\Delta$Th1, the abrupt steering state can be determined to exist, that is, a high flowrate can be determined to be required by the power cylinder 7**. Thus, N is increased. As a result, insufficiency of the flowrate can be suppressed, and the steering force required during the abrupt steering can be applied. According to the second embodiment, N* is reset to the maximum revolution number Nmax. As a result, the required steering force can be applied more reliably.

On the other hand, the second electric motor control part 108 is configured to control driving of the second electric motor 5 based on $\Delta$Th. In other words, the target torque calculation part 108*a* calculates the target torque Tm* of the second electric motor 5 based on $\Delta$Th. In this way, driving of the second electric motor 5 is controlled in accordance with $\Delta$Th, namely, the increase/decrease in Th. Thus, the steering force more closely following the steering intention of the driver can be applied. Specifically, the second electric motor control part 108 controls driving of the second electric motor 5 when $\Delta$Th is equal to or more than $\Delta$Th1. In other words, the target torque calculation part 108*a* sets Tm* when $\Delta$Th is equal to or more than $\Delta$Th1. In this way, the abrupt steering state is determined to have occurred and the second electric motor 5 is driven when the increase amount $\Delta$Th of Th is high. Thus, the steering responsiveness can be increased. According to the second embodiment, Tm* is set in accordance with $\Delta$Th. As a result, the required steering force can be applied more reliably while the electric power consumption is suppressed.

The second electric motor control part 108 may be configured to control driving of the second electric motor 5 when $\Delta$Th is equal to or more than $\Delta$Th1, and Th is equal to or more than a predetermined value. In this case, the target torque calculation part 108*a* determines that abrupt steering has occurred when such a condition that the magnitude of Th is equal to or more than the predetermined value is satisfied in addition to such a condition that ΔTh is equal to or more than ΔTh1. Moreover, Tm* is set in accordance with the increase in ΔTh or Th. More precise determination can be made in this way by using whether both Th and ΔTh are equal to or more than the predetermined values, respectively, as the determination condition for the abrupt steering. For example, it is possible to avoid such a state that an increase in ΔTh caused by a kickback from a road surface or the like is determined by mistake to be caused by the abrupt steering. The predetermined value, which is the determination threshold for Th, and the predetermined value ΔTh1, which is the determination threshold for ΔTh, may be the same value or different values.

Third Embodiment

In the power steering device 1 according to a third embodiment, the execution revolution number calculation part 107a2 in the first electric motor control part 107 is configured to use the steering torque Th calculated by the steering torque calculation part 104 to calculate the execution revolution number Nexe. For example, in the map of FIG. 6, Th is used in place of ωh. In other words, the execution revolution number calculation part 107a2 sets Nexe such that Nexe increases as Th becomes higher. Moreover, Th1 is set in place of ωh1. In the map of FIG. 6, Th may be used together with ωh. For example, the graph of FIG. 6 may be set so as to be translated in parallel toward the increase side of Nexe, or the gradient of the straight line of the graph of FIG. 6 may be set so as to increase, in the case where Th is high compared with the case where Th is low. The other configuration is the same as that of the first embodiment.

A description is now given of actions and effects. The first electric motor control part 107 is configured to control driving of the first electric motor 60 in accordance with the value of the steering torque Th. In this way, driving of the first electric motor 60 is controlled in accordance with Th, namely, the steering intention of the driver. As a result, the steering control can be carried out in accordance with the steering intention. The other actions and effects are the same as those of the first embodiment.

Fourth Embodiment

In the power steering device 1 according to a fourth embodiment, the control device 100 includes a steering acceleration signal reception part (not shown). The steering acceleration signal reception part is configured to calculate a steering acceleration dωh, which is the rotation acceleration of the input shaft 22, based on the calculated steering speed ωh. For example, dωh can be calculated as the derivative of ωh based on a difference between ωh previously calculated and ωh currently calculated. The method of calculating dωh is not limited to this method. Moreover, the control device 100 (steering acceleration signal reception part) may be configured to receive a signal of the steering acceleration dωh from the outside.

The execution revolution number calculation part 107a2 in the first electric motor control part 107 is configured to use dωh calculated by the steering acceleration signal reception part to calculate the execution revolution number Nexe. For example, in the map of FIG. 6, dωh is used in place of ωh. In other words, the execution revolution number calculation part 107a2 sets Nexe such that Nexe increases as dωh becomes larger. Moreover, dωh1 is set in place of ωh1. In the map of FIG. 6, dωh may be used together with ωh. For example, the graph of FIG. 6 may be set so as to be translated in parallel toward the increase side of Nexe, or the gradient of the straight line of the graph of FIG. 6 may be set so as to increase, in the case where dωh is large compared with the case where dωh is small.

The target torque calculation part 108a in the second electric motor control part 108 is configured to use dωh calculated by the steering acceleration signal reception part to calculate the target torque Tm*. For example, in the map of FIG. 7, dωh is used in place of Th. In other words, the target torque calculation part 108a sets Tm* such that Tm* increases as dωh becomes larger. Moreover, dωh2 is set in place of Th2. In the map of FIG. 7, dωh may be used together with Th. The other configuration is the same as that of the first embodiment.

A description is now given of actions and effects. The first electric motor control part 107 is configured to control driving of the first electric motor 60 when the signal of dωh is equal to or more than the predetermined value dωh1. dωh can be detected at an earlier timing than the steering angle θh and the steering angular velocity ωh. Thus, the steering intention can be detected at the earlier timing based on dωh, and the responsiveness of the steering control by using the power cylinder 7 can thus be increased. Moreover, in this case, the respective components for detecting Th, namely, the second torsion bar 26, the steering torque calculation part 104, and the like, may be omitted.

Moreover, the second electric motor control part 108 is configured to control driving of the second electric motor 5 when the signal of dωh is equal to or more than the predetermined value dωh2. Thus, the steering intention can be detected at the earlier timing as described above, and the responsiveness of the steering control by using the second electric motor 5 can thus be secured. Moreover, in this case, the respective components for detecting Th may be omitted. The other actions and effects are the same as those of the first embodiment.

Fifth Embodiment

Figure 13:
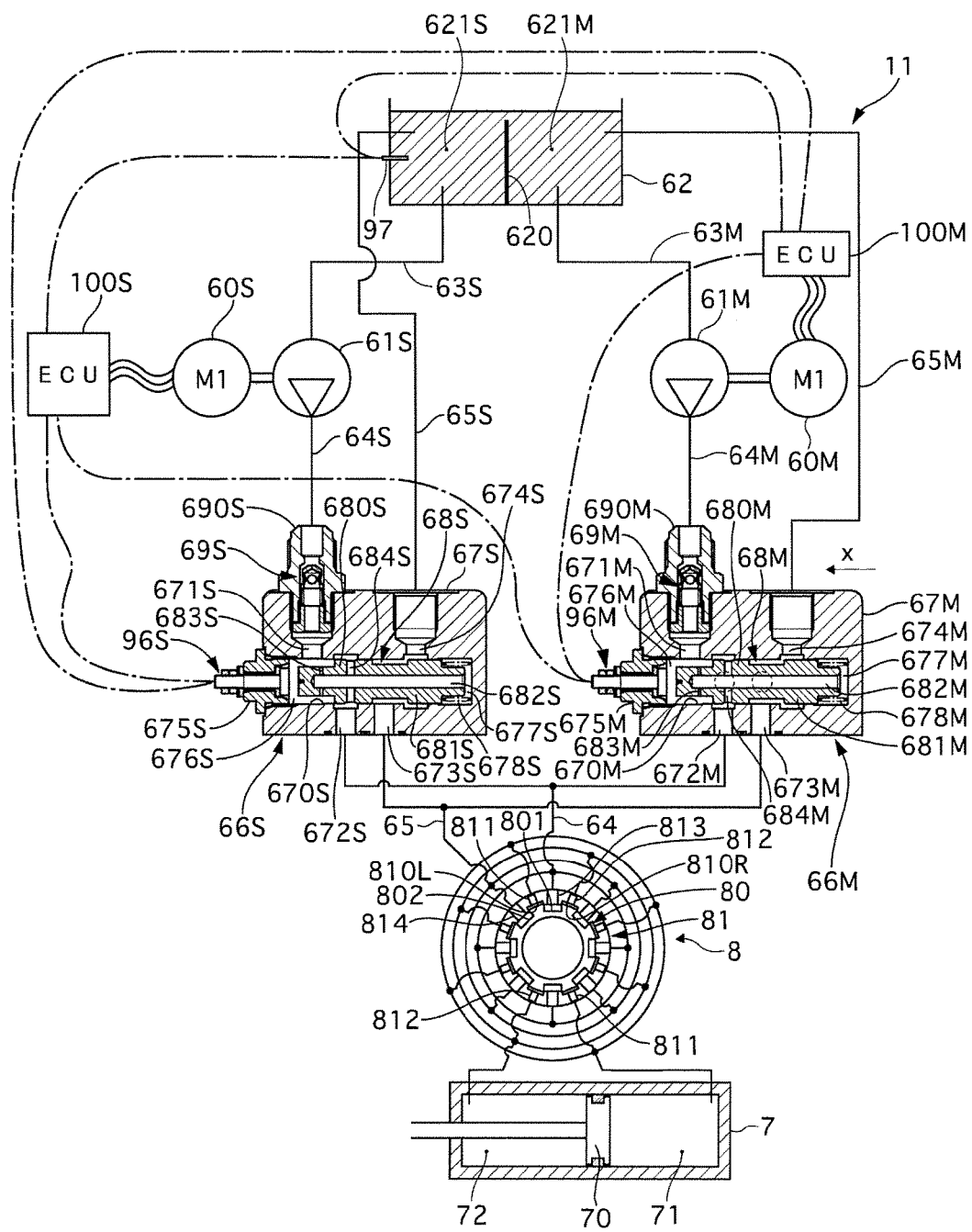
FIG. 13 is a diagram for illustrating a system of a first power steering mechanism of a fifth embodiment.

First, a description is given of the configuration of the power steering device 1 according to a fifth embodiment. Components common to the first and fifth embodiments are denoted by the same reference numerals as those of the first embodiment, and a description thereof is omitted here. Only the components different from those of the first embodiment are described. FIG. 13 is a diagram for schematically illustrating the system of the first power steering mechanism 11. The first power steering mechanism 11 includes, as the pump device 61, a main pump device 61M and a sub pump device 61S. In the following, reference numerals of components corresponding to the main pump device 61M are suffixed by M, and reference numerals of components corresponding to the sub pump device 61S are suffixed by S for discriminating the components from each other. Both the pump devices 61M and 61S are variable displacement vane pumps as in the first embodiment. The pump devices 61M and 61S are separate pump devices, and are capable of supplying the working fluid to the hydraulic chambers 71 and 72 of the power cylinder 7 independently of each other. The pump displacements of both the pump devices 61M and 61S are approximately equal to each other. Driving of the main pump device 61M is controlled by a first electric motor 60M, and driving of the sub pump device 61S is controlled by a first electric motor 60S. The electric motors 60M and 60S are separate motors, and are capable of controlling driving of the respective pump devices 61M and 61S independently of each other.

Both the pump devices 61M and 61S include circulation fluid passages, respectively. The inside of the reservoir tank 62 is partitioned by a partition 620 into a main chamber 621M and a sub chamber 621S. The working fluid is shared only above the partition 620. The circulation fluid passage of the main pump device 61M includes pipes (fluid passages) 63M, 64M, and 65M. The suction fluid passage 63M connects the main chamber 621M of the reservoir tank 62 and the suction side of the main pump device 61M. The supply fluid passage 64M connects the discharge side of the main pump device 61M and the supply fluid passage 813 of the control valve 8. The discharge fluid passage 65M connects the discharge fluid passage 814 of the control valve 8 and the main chamber 621M of the reservoir tank 62. A main valve unit 66M is provided in the course of the fluid passages 64M and 65M. The configuration of the circulation fluid passage of the sub pump 61S is the same as that of the circulation fluid passage of the main pump device 61M. A sub valve unit 66S is provided in the course of fluid passages 64S and 65S.

The main valve unit 66M includes a valve housing 67M, a spool valve 68M, a check valve 69M, and a shutoff state detection sensor 96M. A valve containing hole 670M, a supply feed-in port 671M, a supply feed-out port 672M, a discharge feed-in port 673M, and a discharge feed-out port 674M are formed inside the valve housing 67. In the following, an x axis is provided in a longitudinal direction of the valve containing hole 670M, and the left side of FIG. 13 is set as a positive direction. The valve containing hole 670M has a bottomed tubular shape, and opens on an outer surface of the valve housing 67 on the positive side in the x axis direction. The port 671M and other ports extend in a radial direction of the valve containing hole 670M (hereinafter simply referred to as "radial direction"). Inner ends in the radial direction of the port 671M and other ports open on an inner peripheral surface of the valve containing hole 670M. The supply feed-out port 672M neighbors the negative side in the x axis direction of the supply feed-in port 671M. The discharge feed-in port 673M neighbors the negative side in the x axis direction of the supply feed-out port 672M. The discharge feed-out port 674M neighbors the negative side in the x axis direction of the discharge feed-in port 673M. An outer end in the radial direction of the supply feed-in port 671M is connected to the supply fluid passage 64M on the side of the main pump device 61M with respect to the main valve unit 66M. An outer end in the radial direction of the supply feed-out port 672M connected to the supply fluid passage 64M on the side of the control valve 8 with respect to the main valve unit 66M. An outer end in the radial direction of the discharge feed-in port 673M is connected to the discharge fluid passage 65M on the side of the control valve 8 with respect to the main valve unit 66M. An outer end in the radial direction of the discharge feed-out port 674M is connected to the discharge fluid passage 65M on the side of the reservoir tank 62 with respect to the main valve unit 66M.

The spool valve 68M is contained inside the valve housing 67M. A longitudinal direction of the spool valve 68M is the x axis direction. The spool valve 68M includes a supply land part 680M and a discharge land part 681M. An axial hole 682M extending in the X axis direction is formed inside the spool valve 68M. A positive side end in the x axis direction of the axial hole 682M is closed. A negative side end in the x axis direction of the axial hole 682M opens on a negative side end surface in the x axis direction of the spool valve 68M. Orifices 683M extending in the radial direction of the spool valve 68M (hereinafter simply referred to as "radial direction") are provided inside the spool valve 68M on the positive side in the x axis direction with respect to the supply land part 680M. A plurality of orifices 683M are provided side by side in a direction around the axis (hereinafter referred to as "circumferential direction") of the spool valve 68. Outer ends in the radial direction of the orifices 683M open on an outer peripheral surface of the spool valve 68M. Inner ends in the radial direction of the orifices 683M are connected to the axial hole 682M. Radial holes 684M extending in the radial direction are formed inside the supply land part 680M. A plurality of radial holes 684M are formed side by side in the circumferential direction. Outer ends in the radial direction of the radial holes 684M open on an outer peripheral surface of the supply land part 680M. Inner ends in the radial direction of the radial holes 684M are connected to the axial hole 682M.

The opening on the positive side in the x axis direction of the valve containing hole 670M is sealed by a plug member 675M. A high pressure chamber 676M and a low pressure chamber 677M are partitioned by the spool valve 68M inside the valve containing hole 670M. The high pressure chamber 676M is formed between a negative side end surface in the x axis direction of the plug member 675M and a positive side end surface in the x axis direction of the supply land part 680M. The low pressure chamber 677M is formed between a negative side end surface in the x axis direction of the discharge land part 681M and a bottom surface on a negative side in the x axis direction of the valve containing hole 670M. A coil spring 678M is provided between the end surface of the discharge land part 681M and the bottom surface of the valve containing hole 670M in the low pressure chamber 677M. The coil spring 678M is a return spring for always biasing the spool valve 68M toward the positive side in the x axis direction with respect to the valve housing 67M. The supply feed-in port 671M and the orifices 683M open in the high pressure chamber 676M regardless of a position in the x axis direction of the spool valve 68M (this condition is referred to as "always"). The radial holes 684M always communicate to the supply feed-out port 672M. Communication between the supply feed-out port 672M and the discharge feed-in port 673M is always shut off by the supply land part 680M. A check valve 69M is contained inside a check valve housing 690M. The check valve housing 690M is provided in an opening part outside in the radial direction of the supply feed-in port 671M in the valve housing 67M. The check valve 69M is provided on the side of the main pump device 61M with respect to the spool valve 68M in the supply fluid passage 64M, and is configured to allow only a flow from the main pump device 61M toward the spool valve 68M.

The shutoff state detection sensor 96M is provided in the plug member 675M. The shutoff state detection sensor 96M is configured to electrically detect the action state of the spool valve 68M, and output a signal. The sub valve unit 66S has a configuration similar to that of the main valve unit 66M. The fluid amount sensor 97 is provided at a position lower than a partition 620 in the sub chamber 621S of the reservoir tank 62. The fluid amount sensor 97 is configured to electrically detect whether or not the fluid surface is less than the height of the fluid amount sensor 97, and output a signal. The control devices 100M and 100S are configured to receive inputs of signals from the shutoff state detection sensors 96M and 96S, respectively, and of signals from the fluid amount sensor 97. Both the control devices 100M and 100S are separate control units, and are capable of controlling driving of the respective electric motors 60M and 60S independently of each other. The control device 100M (first electric motor control part 107M thereof) is configured to control driving of the first electric motor 60M. The control device 100S (first electric motor control part 107S thereof) is configured to control driving of the first electric motor 60S. The second electric motor control part 108 may be provided in any one of the control devices 100M and 100S, or may be provided separately from the control devices 100M and 100S.

A description is now given of actions and effects. The main valve unit 66M is provided between the main pump device 61M and the control valve 8, and communication and shutoff of the working fluid therebetween are switched. The position of the spool valve 68M when the spool valve 68M is maximally displaced toward the positive side in the x axis direction and a positive side end in the x axis direction of the spool valve 68 abuts against the plug member 675M is set to an initial position. At the initial position, the communication between the high pressure chamber 676M (supply feed-in port 671M) and the supply feed-out port 672M is shut off by the supply land part 680M. Moreover, the communication between the discharge feed-in port 673M and the discharge feed-out port 674M is shut off by the discharge land part 681M. The shutoff state detection sensor 96M is configured to detect the state in which the spool valve 68M is at the initial position (namely, the state in which communication between the ports is shut off).

When the working fluid is discharged from the main pump device 61M, the working fluid is fed into the high pressure chamber 676M via the supply feed-in port 671M. The supply land part 680M is pushed toward the negative side in the x axis direction by the pressure in the high pressure chamber 676M. When a force caused by this pressure becomes more than the biasing force of the coil spring 678M, the spool valve 68M moves (strokes) toward the negative side in the x axis direction. As a result, the high pressure chamber 676M (supply feed-in port 671M) and the supply feed-out port 672M communicate to each other. Moreover, the discharge feed-in port 673M and the discharge feed-out port 674M communicate to each other. As a result, the working fluid is supplied from the main pump device 61M to the control valve 8 via the spool valve 68M. Moreover, unnecessary working fluid is discharged from the control valve 8 to the reservoir tank 62 side via the spool valve 68M. The working fluid is fed from the side of the high pressure chamber 676M into the low pressure chamber 677M via the orifices 683M, the radial holes 684M, and the axial holes 682M. The discharge land part 681M is pushed toward the positive side in the x axis direction by the pressure in the low pressure chamber 677M. When a difference between a force by the pressure of the low pressure chamber 677M and the force by the pressure of the high pressure chamber 676M is more than the biasing force of the coil spring 678M, the spool valve 68M moves toward the negative side in the x axis direction. A difference (differential pressure) between the pressure in the low pressure chamber 677M and the pressure in the high pressure chamber 676M is increased by an orifice effect by the orifices 683M and the like as the discharge flowrate of the main pump device 61M increases. When the discharge flowrate decreases, and the force caused by the differential pressure thus becomes equal to or less than the biasing force of the coil spring 678M, the spool valve 68M moves toward the positive side in the x axis direction. A movement amount of the spool valve 68M (degree of communication between ports) is adjusted according to the discharge flowrate. The shut-off state detection sensor 96M is configured to detect a state in which the spool valve 68M is not at the initial position (that is, the main pump device 61M is active, and the differential pressure is thus generated).

The action of the sub valve unit 66S is the same as the action of the main valve unit 66M. The main valve unit 66M and the sub valve unit 66S are capable of switching, independently of each other, communication and shutoff of the working fluid between the pump device 61 and the control valve 8 in the respective circulation fluid passages. Thus, for example, under a state in which one pump device 61 is not supplying the working fluid to the control valve 8, the other pump device 61 can supply the working fluid to the control valve 8. As a result, even when a fluid leakage occurs due to a damage in the reservoir tank 62, the fluid passage, or the like of one circulation passage, or a failure occurs in the pump device 61, the other circulation fluid passage can be used to continue the steering assist. Moreover, under a state in which one pump device 61 is supplying the working fluid, the other pump device 61 can also supply the working fluid. Thus, a unique discharge flowrate of at least one of the pump devices 61 may be set low. As a result, a drive load on the pump device 61 can be reduced, and the energy saving effect can be increased under a state in which the required flowrate is low, for example, a state in which the vehicle travels straight. Moreover, the check valve 69 suppresses a backward flow of the working fluid from the one pump device 61 side to the other pump device 61 side. Thus, for example, in the case where the pump device 61 is stopped in one circulation fluid passage due to occurrence of a fluid leakage in this circulation fluid passage, it is possible to avoid such a state in which the working fluid discharged from the pump device 61 in the other circulation fluid passage flows backward to the one circulation fluid passage, and the working fluid thus leaks.

As described above, the device 1 includes the sub pump device (second pump device) 61S that is separate from the main pump device 61M, and is configured to supply the working fluid to the pair of hydraulic chambers 71 and 72 of the power cylinder 7, and the first electric motor (third electric motor) 60S configured to control driving of the sub pump device 61S. The main pump device 61M and the sub pump device 61S can be selectively operated by providing the sub pump device 61S and the first electric motor 60s in this way. Thus, the steering force can be applied more flexibly. According to the fifth embodiment, the pump displacements of both the pump devices 61M and 61S are approximately equal to each other. Thus, both the pump devices 61M and 61S can be used in common. Thus, productivity of the device 1 can be increased. The (maximum) pump displacements (or the unique discharge flowrates) of both the pump devices 61M and 61S may be different from each other. In this case, more flexible operation can be carried out. For example, in a case where the discharge flowrate may be low, only the pump device 61 having the smaller (maximum) pump displacement (or unique discharge flowrate) can be driven through control. As a result, for example, the energy saving effect can be increased under the state in which the required flowrate is low, for example, a state in which the vehicle travels straight. The other actions and effects are the same as those of the first embodiment.

Other Embodiments

A description has been given of the modes for carrying out the present invention based on the embodiments, but the specific configurations of the present invention are not limited to the embodiments. The present invention includes design change and the like as long as such design change does not depart from the gist of the present invention. For example, in the steering mechanism, the gear mechanism may be a rack and pinion gear mechanism that includes a pinion provided integrally with the output shaft, and a rack for meshing with the pinion. In this case, the power cylinder and the piston of the first power steering mechanism are provided on a rack shaft. The rack and pinion function as the conversion mechanism for converting the rotation of the output shaft into the axial movement of the piston. Tie rods coupled to both ends of the rack function as transmission mechanisms for transmitting the axial motion of the piston to the steered wheels. Moreover, as the first and second power steering mechanisms, configurations other than the embodiments can appropriately be employed. The second electric motor may be connected to the input shaft, and is not limited to the hollow configuration enclosing a part in the axial direction of the input shaft. Moreover, the configurations of the respective embodiments can appropriately be combined.

The present application claims priority to the Japanese Patent Application No. 2015-028634 filed on Feb. 17, 2015. The entire disclosure including the specification, the claims, the drawings, and the abstract of Japanese Patent Application No. 2015-028634 filed on Feb. 17, 2015 is incorporated herein in its entirety by reference.

REFERENCE SIGNS LIST 200 steering wheel, 21 input shaft, 23 intermediate shaft, 24 output shaft, 25 first torsion bar (torsion bar), 26 second torsion bar (torsion bar for torque sensor), 30 ball nut mechanism (conversion mechanism), 40 sector shaft (transmission mechanism), 41 pitman arm (transmission mechanism), 45 steered wheel, 5 second electric motor, 60 first electric motor, 60S first electric motor (third electric motor), 61 pump device, 61S sub pump device (second pump device), 7 power cylinder, 70 piston, 71 first hydraulic chamber, 72 second hydraulic chamber, 8 rotary valve, 91 first resolver (first rotation angle sensor), 92 second resolver (second rotation angle sensor), 100 control device, 102 steering angle signal reception part, 104 steering torque calculation part, 105 first motor revolution number signal reception part, 106 working fluid temperature signal reception part, 107 first electric motor control part, 107a1 standby revolution number calculation part (standby rotation control part), 107b first motor drive circuit (standby rotation control part), 108 second electric motor control part

The invention claimed is:

1. A power steering device, comprising:
an input shaft configured to be rotated by a steering operation on a steering wheel;
an output shaft connected to the input shaft via a torsion bar;
a power cylinder including a pair of hydraulic chambers partitioned by a piston, and configured to generate a steering assist force for a steered wheel;
a conversion mechanism configured to convert rotation of the output shaft into an axial motion of the piston;
a transmission mechanism configured to transmit the axial motion of the piston to the steered wheel;
a pump device configured to be driven through control by a first electric motor and configured to discharge working fluid;
a rotary valve configured to selectively supply the working fluid supplied from the pump device to the pair of hydraulic chambers of the power cylinder in accordance with relative rotation between the input shaft and the output shaft;
a hollow second electric motor provided so as to surround at least a part in an axial direction of the input shaft and configured to control the rotation of the input shaft;
a control device including a microcomputer configured to control driving of the hollow second electric motor;
a first motor revolution number signal reception part installed in the control device and configured to receive a revolution number signal of the first electric motor; and
a second electric motor control part installed in the control device and configured to output a control signal for controlling driving of the second electric motor based on the revolution number signal of the first electric motor.

2. The power steering device according to claim 1, wherein the second electric motor control part controls the driving of the second electric motor when a number of revolutions of the first electric motor is equal to or less than a predetermined value.

3. The power steering device according to claim 1, comprising:
a torque sensor torsion bar provided between the input shaft and the torsion bar;
an intermediate shaft provided between the torque sensor torsion bar and the torsion bar;
a first rotation angle sensor configured to detect a rotation angle of the input shaft; and
a second rotation angle sensor configured to detect a rotation angle of the intermediate shaft,
wherein the control device includes a steering torque calculation part configured to calculate a steering torque to be generated in the torque sensor torsion bar, based on an output signal from the first rotation angle sensor and an output signal from the second rotation angle sensor.

4. The power steering device according to claim 3, wherein the second electric motor control part is configured to control driving of the second motor based on the steering torque.

5. The power steering device according to claim 4, wherein the second electric motor control part is configured to control the driving of the second electric motor based on a change amount of the steering torque.

6. The power steering device according to claim 5, wherein the second electric motor control part is configured to control the driving of the second electric motor when the change amount of the steering torque is equal to or more than a predetermined value.

7. The power steering device according to claim 6, wherein the second electric motor control part is configured to control the driving of the second electric motor when the change amount of the steering torque is equal to or more than the predetermined value, and the steering torque is equal to or more than a predetermined value.

8. The power steering device according to claim 6, wherein the first electric motor control part is configured to control driving of the first electric motor such that a number of revolutions of the first electric motor increases when the change amount of the steering torque is equal to or more than the predetermined value.

9. The power steering device according to claim 3, wherein the first electric motor control part is configured to control driving of the first electric motor in accordance with a value of the steering torque.

10. The power steering device according to claim 9, wherein:
the control device includes a steering angle signal reception part configured to receive a steering angle signal, which is a rotation angle of the input shaft,
the first electric motor control part includes a standby rotation control part configured to control the driving of the first electric motor such that the first electric motor continues to rotate under a state in which a number of revolutions of the first electric motor is equal to or less than a predetermined value when the steering angle signal is equal to or less than a predetermined value, and
the standby rotation control part is configured to variably control, based on the steering torque, the number of revolutions of the first electric motor under the state in which the steering angle signal is equal to or less than the predetermined value.

11. The power steering device according to claim 10, wherein the standby rotation control part is configured to control the driving of the first electric motor such that the number of revolutions of the first electric motor decreases when the steering angle signal is equal to or less than the predetermined value, and the steering torque is equal to or less than a predetermined value.

12. The power steering device according to claim 11, wherein, when the steering angle signal is equal to or less than the predetermined value, and the steering torque is equal to or more than the predetermined value, the standby revolution number control part controls driving of the first electric motor such that the number of revolutions of the first electric motor increases, and the second electric motor control part controls the driving of the second electric motor.

13. The power steering device according to claim 9, wherein:
the control device includes a steering speed signal reception part configured to receive a steering speed signal, which is a rotation speed of the input shaft, and
the first electric motor control part is configured to control the driving of the first electric motor based on the steering torque and the steering speed signal.

14. The power steering device according to claim 9, wherein the first electric motor control part is configured to control the driving of the first electric motor in accordance with a change amount of the steering torque.

15. The power steering device according to claim 1, wherein the second electric motor control part is configured to decrease a number of revolutions of the second electric motor when a number of revolutions of the first electric motor is equal to or more than a predetermined value.

16. The power steering device according to claim 15, wherein the second electric motor control part is configured to control the driving of the second electric motor such that a rotation torque of the second electric motor decreases in accordance with the number of revolutions of the first electric motor when the number of revolutions of the first electric motor is equal to or more than the predetermined value.

17. The power steering device according to claim 1, wherein:
the control device includes a working fluid temperature signal reception part configured to receive a signal representing a temperature of the working fluid, and
the second electric motor control part is configured to control the driving of the second electric motor based on the signal representing the temperature of the working fluid.

18. The power steering device according to claim 17, wherein the second electric motor control part is configured to control the driving of the second electric motor such that a rotation torque of the second electric motor increases as the temperature of the working fluid decreases.

19. The power steering device according to claim 1, wherein:
the control device includes a steering angle signal reception part configured to receive a steering angle signal, which is a rotation angle of the input shaft, and a first electric motor control part configured to control driving of the first electric motor, and
the first electric motor control part is configured to control the driving of the first electric motor such that a number of revolutions of the first electric motor decreases when the steering angle signal is equal to or less than a predetermined value.

20. The power steering device according to claim 19, wherein the first electric motor control part is configured to stop the first electric motor when the steering angle signal is equal to or less than the predetermined value.

21. The power steering device according to claim 1, comprising:
a second pump device, which is separate from the pump device and is configured to supply the working fluid to the pair of hydraulic chambers of the power cylinder; and
a third electric motor configured to control driving of the second pump device.

22. The power steering device according to claim 21, wherein the pump device and the second pump device have the same discharge amount per rotation.

23. The power steering device according to claim 21, wherein the pump device and the second pump device have different discharge amounts per rotation.

24. The power steering device according to claim 1, wherein:
the control device includes a steering acceleration signal reception part configured to receive a signal of a steering acceleration, which is a rotation acceleration of the input shaft, and
the second electric motor control part is configured to control the driving of the second electric motor when the signal of the steering acceleration is equal to or more than a predetermined value.

25. The power steering device according to claim 24, wherein the first electric motor control part is configured to control driving of the first electric motor when the signal of the steering acceleration is equal to or more than the predetermined value.

* * * * *